US012552168B2

(12) United States Patent
Hirasawa

(10) Patent No.: US 12,552,168 B2
(45) Date of Patent: Feb. 17, 2026

(54) MAINTENANCE DEVICE, LIQUID EJECTING DEVICE, AND MAINTENANCE METHOD FOR LIQUID EJECTING DEVICE

(71) Applicant: SEIKO EPSON CORPORATION, Tokyo (JP)

(72) Inventor: Yusuke Hirasawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 18/507,760

(22) Filed: Nov. 13, 2023

(65) Prior Publication Data

US 2024/0157702 A1 May 16, 2024

(30) Foreign Application Priority Data

Nov. 16, 2022 (JP) ................................ 2022-183558

(51) Int. Cl.
*B41J 2/165* (2006.01)

(52) U.S. Cl.
CPC .. *B41J 2/16511* (2013.01); *B41J 2002/16582* (2013.01)

(58) Field of Classification Search
CPC .......... B41J 2/16511; B41J 2002/16582; B41J 2/16532; B41J 2/1721; B41J 2/17596; B41J 23/025; B41J 2/16508
USPC .......................................................... 347/20
See application file for complete search history.

(56) References Cited

U.S. PATENT DOCUMENTS

2006/0250441 A1 11/2006 Shimizu
2017/0087845 A1* 3/2017 Ogawa ................ B41J 2/16523
2019/0255843 A1* 8/2019 Yamagishi .............. B41J 2/175
2022/0332122 A1 10/2022 Koase

FOREIGN PATENT DOCUMENTS

JP 2000-153617 A 6/2000
JP 2006-305785 A 11/2006
JP 2022-165013 A 10/2022

* cited by examiner

*Primary Examiner* — Jason S Uhlenhake
*Assistant Examiner* — Alexander D Shenderov
(74) *Attorney, Agent, or Firm* — WORKMAN NYDEGGER

(57) ABSTRACT

A maintenance device includes a cap, a cap moving portion, a suction portion, a switching portion, and a drive transmission unit, wherein the drive transmission unit includes a drive source, a first transmission mechanism, and a second transmission mechanism, the first transmission mechanism includes a first drive delay unit that does not transmit driving of the drive source even when the drive source drives by a certain amount when the drive source performs switching of the switching portion via the second transmission mechanism, and the second transmission mechanism includes a second drive delay unit that does not transmit driving of the drive source even when the drive source drives by a certain amount when the drive source performs moving of the cap via the first transmission mechanism.

7 Claims, 20 Drawing Sheets

MAINTENANCE DEVICE, LIQUID EJECTING DEVICE, AND MAINTENANCE METHOD FOR LIQUID EJECTING DEVICE

The present application is based on, and claims priority from JP Application Serial Number 2022-183558, filed Nov. 16, 2022, the disclosure of which is hereby incorporated by reference herein in its entirety.

BACKGROUND

1. Technical Field

The present disclosure relates to a maintenance device, a liquid ejecting device and a maintenance method for a liquid ejecting device.

2. Related Art

For example, there is a printer which is an example of a liquid ejecting device that performs printing by ejecting ink which is an example of liquid through a recording head which is an example of a liquid ejecting portion, as described in JP 2006-305785 A. The printer includes an opening surface wiper, a side surface wiper, a driving motor, a first gear mechanism, a second gear mechanism and a time lag mechanism.

The first gear mechanism transmits drive force from the driving motor to the opening surface wiper. The second gear mechanism further transmits the drive force transmitted by the first gear mechanism to the side surface wiper. The time lag mechanism moves the opening surface wiper so as to be delayed from the side surface wiper.

According to JP 2006-305785 A, it is possible to operate only the side surface wiper without operating the opening surface wiper. However, in JP 2006-305785 A, when the opening surface wiper is operated, the side surface wiper is also operated together. That is, in JP 2006-305785 A, it is possible to operate only one unit, but it is not possible to operate only another unit, so that there is a possibility that a durability time of the one unit is shortened.

SUMMARY

A maintenance device for solving the above-described problems includes a cap configured to contact a liquid ejecting portion configured to eject liquid from a nozzle to form a closed space at which the nozzle is open, a cap moving portion configured to vertically move the cap, a suction portion, a switching portion configured to switch a coupling destination of the suction portion, and a drive transmission unit configured to drive the cap moving portion and the switching portion, wherein the drive transmission unit includes a drive source, a first transmission mechanism that transmits drive force of the drive source from the drive source to the cap moving portion, and a second transmission mechanism that transmits the drive force of the drive source from the drive source to the switching portion, the first transmission mechanism includes a first drive delay unit that does not transmit driving of the drive source even when the drive source drives by a certain amount when the drive source performs switching of the switching portion via the second transmission mechanism, and the second transmission mechanism includes a second drive delay unit that does not transmit driving of the drive source even when the drive source drives by a certain amount when the drive source performs moving of the cap via the first transmission mechanism.

A liquid ejecting device for solving the above-described problems includes a liquid ejecting portion configured to eject liquid from a nozzle, a supply flow path configured to supply the liquid to the liquid ejecting portion, and the maintenance device configured as described above, wherein the switching portion is configured to switch a coupling destination of the suction portion between the cap and the supply flow path.

A maintenance method for a liquid ejecting device for solving the above-described problems is a maintenance method for a liquid ejecting device including a liquid ejecting portion configured to eject liquid from a nozzle, a supply flow path configured to supply the liquid to the liquid ejecting portion, a cap configured to contact the liquid ejecting portion to form a closed space at which the nozzle is open, a cap moving portion configured to vertically move the cap, a suction portion, a switching portion configured to switch a coupling destination of the suction portion to the cap or the supply flow path, and a drive transmission unit configured to drive the cap moving portion and the switching portion, the drive transmission unit including a drive source, a first transmission mechanism that transmits drive force of the drive source from the drive source to the cap moving portion, and a second transmission mechanism that transmits the drive force of the drive source from the drive source to the switching portion, the first transmission mechanism including a first drive delay unit that does not transmit driving of the drive source even when the drive source drives by a certain amount when the drive source performs switching of the switching portion via the second transmission mechanism, the second transmission mechanism including a second drive delay unit that does not transmit driving of the drive source even when the drive source drives by a certain amount when the drive source performs moving of the cap moving portion via the first transmission mechanism, the maintenance method including forming the closed space by the cap by moving the cap moving portion in a section in which the driving is not transmitted to the switching portion by the second drive delay unit, switching the coupling destination of the suction portion by the switching portion in a section in which the driving is not transmitted to the cap moving portion by the first drive delay unit, and suctioning by the suction portion.

DESCRIPTION OF EMBODIMENTS

Embodiment

Figure 1:
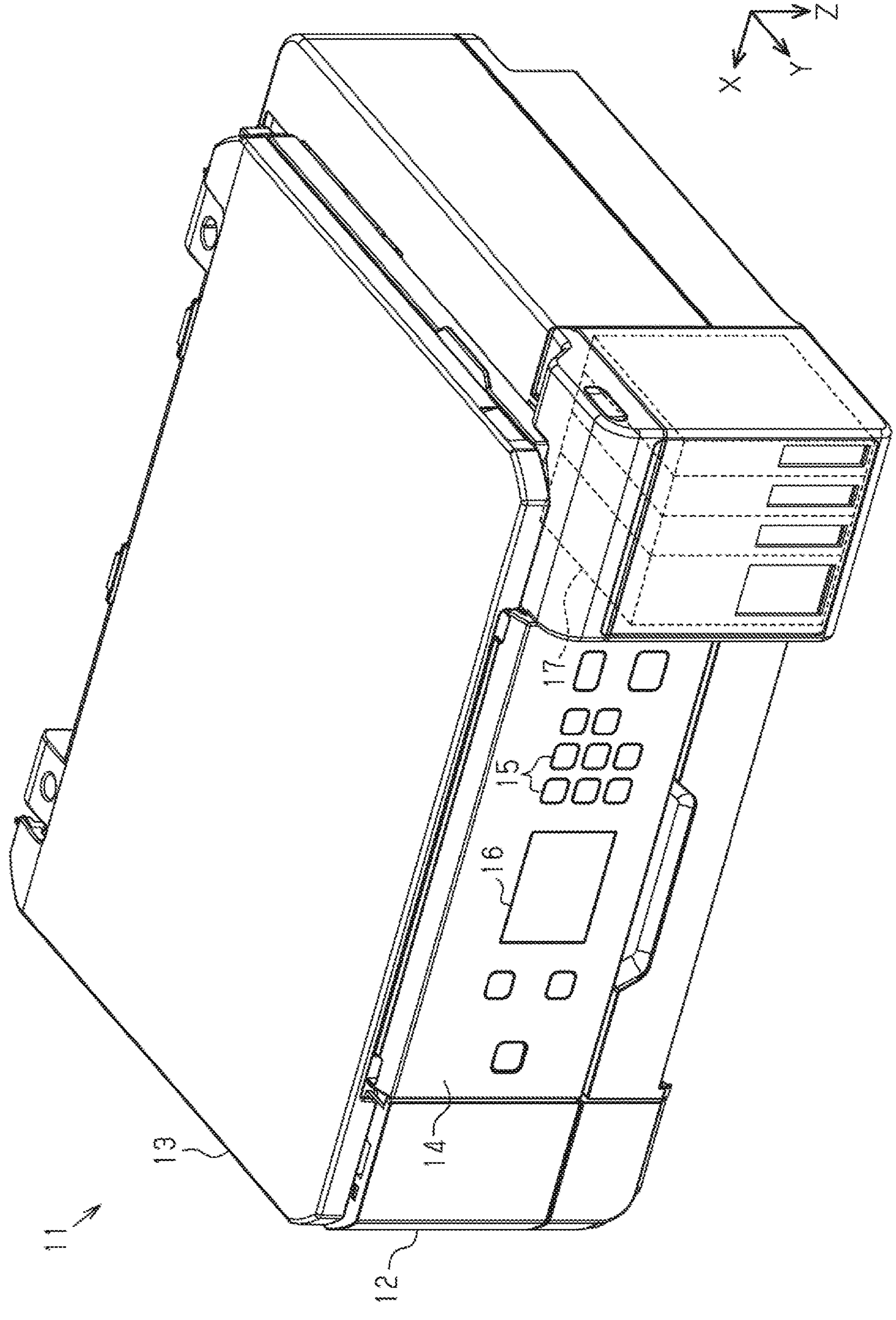
FIG. 1 is a perspective view of an embodiment of a liquid ejecting device.

Hereinafter, an embodiment of a maintenance device, a liquid ejecting device and a maintenance method for the liquid ejecting device will be described below with reference to the drawings. The liquid ejecting device is, for example, an inkjet printer that ejects ink, which is an example of liquid, onto a medium such as paper, fabric, vinyl, a plastic part, or a metal part to perform printing on it.

In the drawings, a Z-axis represents a direction of gravity and an X-axis and a Y-axis represent directions along a horizontal plane, assuming that a liquid ejecting device 11 is placed on a horizontal plane. The X-axis, the Y-axis, and the Z-axis are orthogonal to one another.

Liquid Ejecting Device

As illustrated in FIG. 1, the liquid ejecting device 11 may include a device main body 12 and an image reading device 13. The image reading device 13 is capable of reading an image of a document (not illustrated). The image reading device 13 may be provided at the device main body 12 so as to be openable and closable with respect to the device main body 12.

The liquid ejecting device 11 may include an operating panel 14. The operating panel 14 may include an operation unit 15 for operating the liquid ejecting device 11, and a display unit 16. The display unit 16 of the embodiment is a monitor capable of displaying characters, images, and the like.

The liquid ejecting device 11 may include one or more liquid containers 17. The plurality of liquid containers 17 may contain mutually different types of liquid. The different types of liquid are, for example, different colored inks.

Figure 2:
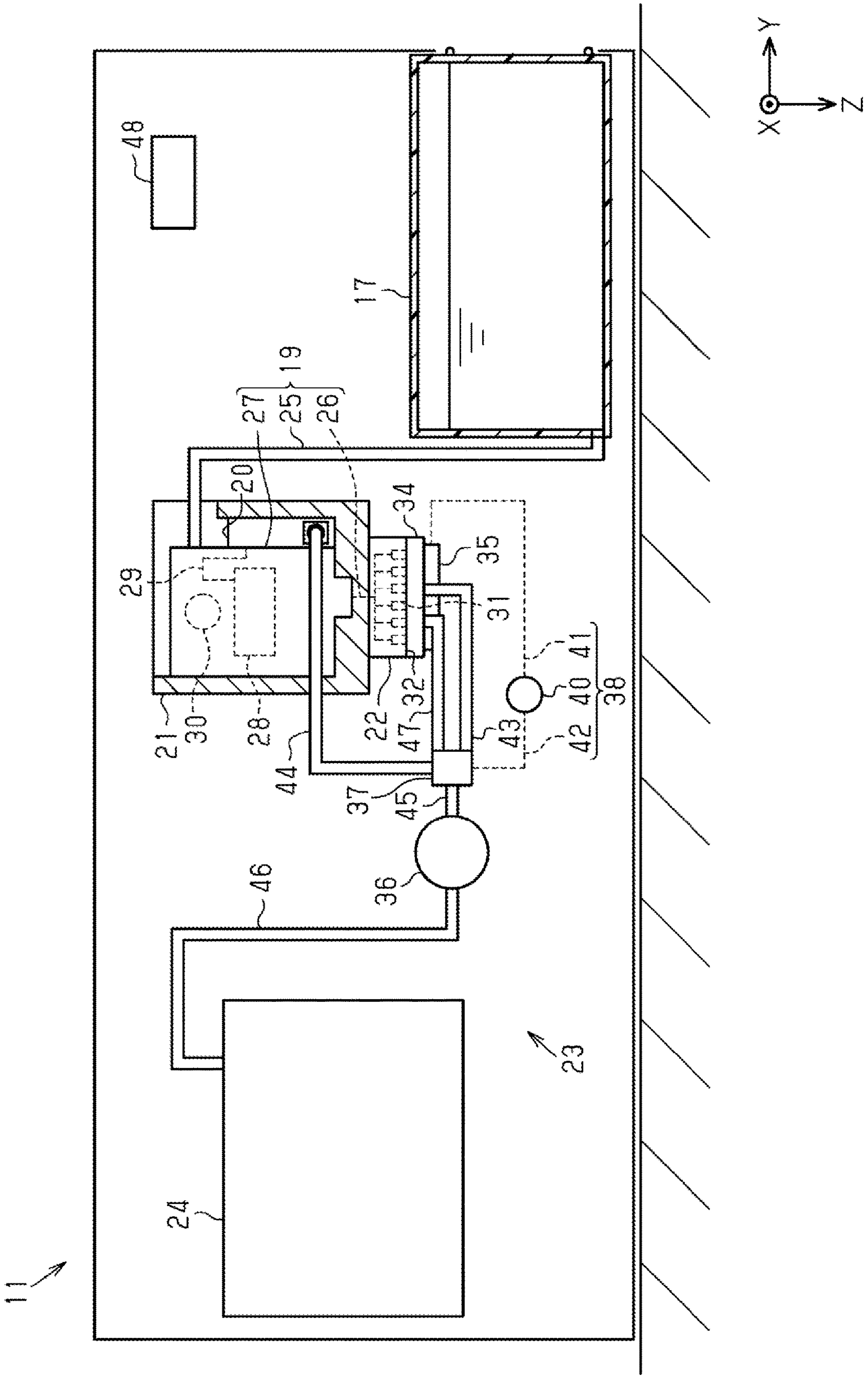
FIG. 2 is a schematic side cross-sectional view of the liquid ejecting device.

As illustrated in FIG. 2, the liquid ejecting device 11 may include a supply flow path 19, a bubble discharge mechanism 20, a carriage 21, a liquid ejecting portion 22, a maintenance device 23, and a waste liquid container 24. The liquid ejecting device 11 may include the same number of supply flow paths 19 as the liquid containers 17. The waste liquid container 24 contains a waste liquid generated in maintenance by the maintenance device 23.

Through the supply flow path 19, liquid can be supplied to the liquid ejecting portion 22. An upstream end of the supply flow path 19 is coupled to the liquid container 17, and a downstream end thereof is coupled to the liquid ejecting portion 22. The supply flow path 19 may include a first supply path 25, a second supply path 26 and a liquid storage unit 27.

The first supply path 25 is a portion of the supply flow path 19 upstream of the liquid storage unit 27. The first supply path 25 couples the liquid container 17 to the liquid storage unit 27. The first supply path 25 supplies the liquid contained in the liquid container 17 to the liquid storage unit 27. At least a part of the first supply path 25 may be configured with a deformable tube.

The second supply path 26 is a portion of the supply flow path 19 downstream of the liquid storage unit 27. The second supply path 26 couples the liquid storage unit 27 to the liquid ejecting portion 22. The second supply path 26 supplies the liquid contained in the liquid storage unit 27 to the liquid ejecting portion 22.

The liquid storage unit 27 may include a storage chamber 28, an exhaust path 29 and an adjustment unit 30. The storage chamber 28 is capable of storing liquid. One end of the exhaust path 29 is coupled to an upper portion of the storage chamber 28, and another end thereof is coupled to the bubble discharge mechanism 20. The adjustment unit 30 adjusts pressure of liquid supplied from the storage chamber 28 to the liquid ejecting portion 22.

The bubble discharge mechanism 20 can discharge bubbles accumulated in the storage chamber 28 by applying a negative pressure to the storage chamber 28 via the exhaust path 29.

The carriage 21 may be mounted with a part of the first supply path 25, the second supply path 26, the liquid storage unit 27, and the bubble discharge mechanism 20. The carriage 21 may reciprocate in a scanning direction, for example, along a guide shaft (not illustrated) provided parallel to the X-axis.

The liquid ejecting portion 22 includes a nozzle surface 32 at which a plurality of nozzles 31 are opened. The liquid ejecting portion 22 is capable of ejecting liquid from the nozzle 31. The liquid ejecting portion 22 ejects the liquid from the nozzle 31 to perform printing on a medium.

Maintenance Device

The maintenance device 23 is a device for maintaining the liquid ejecting device 11. The maintenance device 23 includes a cap 34, a cap moving portion 35, a suction portion 36, a switching portion 37 and a drive transmission unit 38.

The cap 34 is configured to be in contact with the liquid ejecting portion 22. The cap 34 is in contact with the liquid ejecting portion 22 to form a closed space at which the nozzle 31 is opened. Formation of the closed space by the cap 34 is also referred to as capping. The cap 34 covers the nozzle 31 by the capping and suppresses drying of the nozzle 31.

The cap moving portion 35 can vertically move the cap 34. The cap moving portion 35 moves the cap 34 to an upper position to bring into contact with the liquid ejecting portion 22 and a lower position not to bring into contact with the liquid ejecting portion 22. The cap 34 caps the liquid ejecting portion 22 by moving upward in a state of facing the liquid ejecting portion 22.

The suction portion 36 is, for example, a tube pump.

The switching portion 37 can switch a coupling destination of the suction portion 36. Specifically, the switching portion 37 can switch the coupling destination of the suction portion 36 to the cap 34 or the supply flow path 19. The switching portion 37 may switch between a state in which an inside of the cap 34 in a state of being in contact with the liquid ejecting portion 22 is opened to the atmosphere and a state in which the inside of the cap 34 is not opened to the atmosphere by switching a coupling destination of a flow path. The switching portion 37 switches the flow path in accordance with the maintenance by the maintenance device 23.

The drive transmission unit 38 is a mechanism for driving the cap moving portion 35 and the switching portion 37. The drive transmission unit 38 includes a drive source 40, a first transmission mechanism 41 and a second transmission mechanism 42. The drive source 40 is, for example, a motor that is capable of driving to rotate forward and driving to rotate backward. The first transmission mechanism 41 transmits drive force of the drive source 40 from the drive source 40 to the cap moving portion 35. The second transmission mechanism 42 transmits the drive force of the drive source 40 from the drive source 40 to the switching portion 37.

The maintenance device 23 may include a suction pipe 43, an exhaust pipe 44, a coupling pipe 45, a discharge pipe 46 and an open pipe 47. The suction pipe 43, the exhaust pipe 44, the coupling pipe 45, the discharge pipe 46 and the open pipe 47 are, for example, tubes.

The suction pipe 43 couples the cap 34 to the switching portion 37. The exhaust pipe 44 couples the bubble discharge mechanism 20 to the switching portion 37. The exhaust pipe 44 is a pipe for coupling the supply flow path 19 to the suction portion 36 via the bubble discharge mechanism 20. The coupling pipe 45 couples the suction portion 36 to the switching portion 37. The discharge pipe 46 couples the suction portion 36 to the waste liquid container 24. The open pipe 47 couples the cap 34 to the switching portion 37. The open pipe 47 is a pipe for opening the inside of the cap 34 to the atmosphere.

The switching portion 37 switches a coupling destination of the coupling pipe 45 by switching a coupling destination of a flow path. Specifically, the switching portion 37 switches the coupling destination of the coupling pipe 45 between the suction pipe 43 and the exhaust pipe 44. When the coupling pipe 45 is coupled to the suction pipe 43, the suction portion 36 communicates with the cap 34. When the coupling pipe 45 is coupled to the exhaust pipe 44, the suction portion 36 communicates with the supply flow path 19. When the switching portion 37 switches the coupling destination of the coupling pipe 45, a suction target of the suction portion 36 is switched.

The switching portion 37 switches a coupling destination of the open pipe 47 by switching a coupling destination of a flow path. When the switching portion 37 switches the coupling destination of the open pipe 47, the open pipe 47 is switched between a state of communicating with the atmosphere and a state of not communicating with the atmosphere. When the open pipe 47 communicates with the atmosphere in a capped state, the inside of the cap 34 is opened to the atmosphere. When the open pipe 47 does not communicate with the atmosphere in the capped state, the inside of the cap 34 becomes a sealed closed space.

When the suction portion 36 suctions the inside of the cap 34 with the inside of the cap 34 sealed, the liquid ejecting portion 22 is cleaned. When the suction portion 36 suctions the inside of the cap 34 with the inside of the cap 34 open to the atmosphere, liquid in the cap 34 and liquid in the suction pipe 43 are suctioned. That is, the maintenance device 23 performs idle suction in the cap 34. The idle suction is performed after cleaning, for example.

By performing the idle suction in the capped state, a possibility of liquid scattering is reduced. By opening the inside of the cap 34 to the atmosphere through the open pipe 47, for example, a possibility that liquid flows back into the cap 34 is reduced, as compared to a case where the inside of the cap 34 is opened to the atmosphere through the suction pipe 43. The maintenance device 23 may perform the idle suction in a state where the cap 34 is not in contact with the liquid ejecting portion 22.

The liquid ejecting device 11 includes a control unit 48. The control part 48 comprehensively controls driving of each mechanism in the liquid ejecting device 11 and controls various operations performed in the liquid ejecting device 11. The control unit 48 may be configured as a circuit including α: one or more processors that perform various processes according to a computer program, one or more dedicated hardware circuits that perform at least some of the various processes, or y: a combination thereof. The hardware circuit is, for example, an application-specific integrated circuit. A processor includes a CPU and a memory such as a RAM or a ROM which stores program codes or instructions configured to cause the CPU to perform processes. The memory, that is, a computer-readable medium, includes any readable medium that can be accessed by a general purpose or special purpose computer.

Switching Portion

Figure 3:
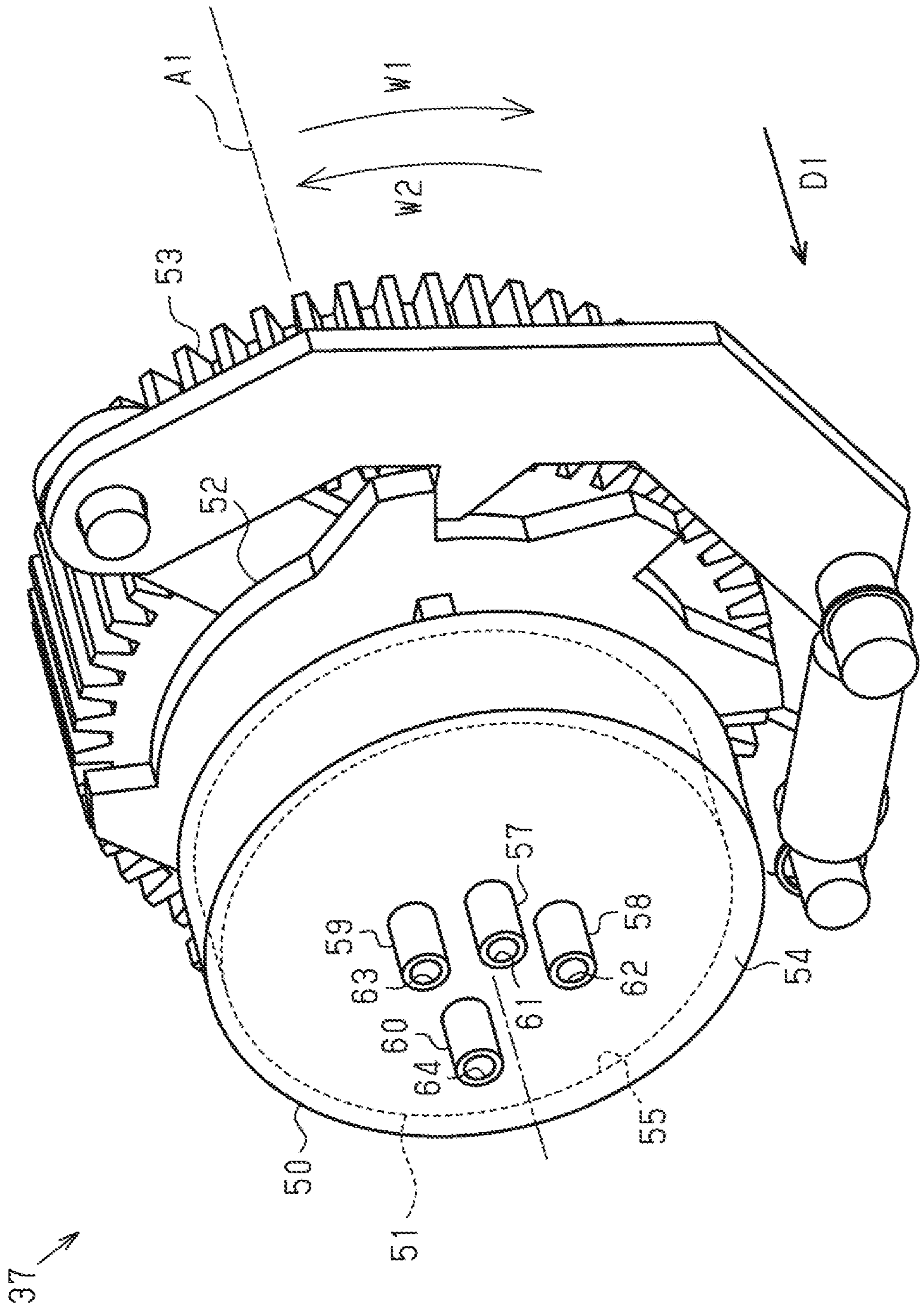
FIG. 3 is a perspective view of a switching portion.

As illustrated in FIG. 3, the switching portion 37 may include a housing 50, a rotary valve 51, a ratchet gear 52 and a driving body 53. The rotary valve 51, the ratchet gear 52 and the driving body 53 rotate with respect to the housing 50. The driving body 53 is rotatable in a forward rotation direction W1 and a backward rotation direction W2. The rotary valve 51 and the driving body 53 rotate about a rotation axis A1. The rotation axis A1 is an imaginary axis. The driving body 53, the ratchet gear 52, the rotary valve 51 and the housing 50 are arranged in this order in an axial direction D1. The axial direction D1 is a direction in which the rotation axis A1 extends.

The housing 50 includes a coupling surface 54 and a contact surface 55. The coupling surface 54 and the contact surface 55 face opposite to each other in the housing 50. Specifically, the coupling surface 54 and the contact surface 55 face opposite to each other in the axial direction D1. The contact surface 55 is in contact with the rotary valve 51. The rotary valve 51 may be pressed against the contact surface 55 by a spring (not illustrated).

Figure 4:
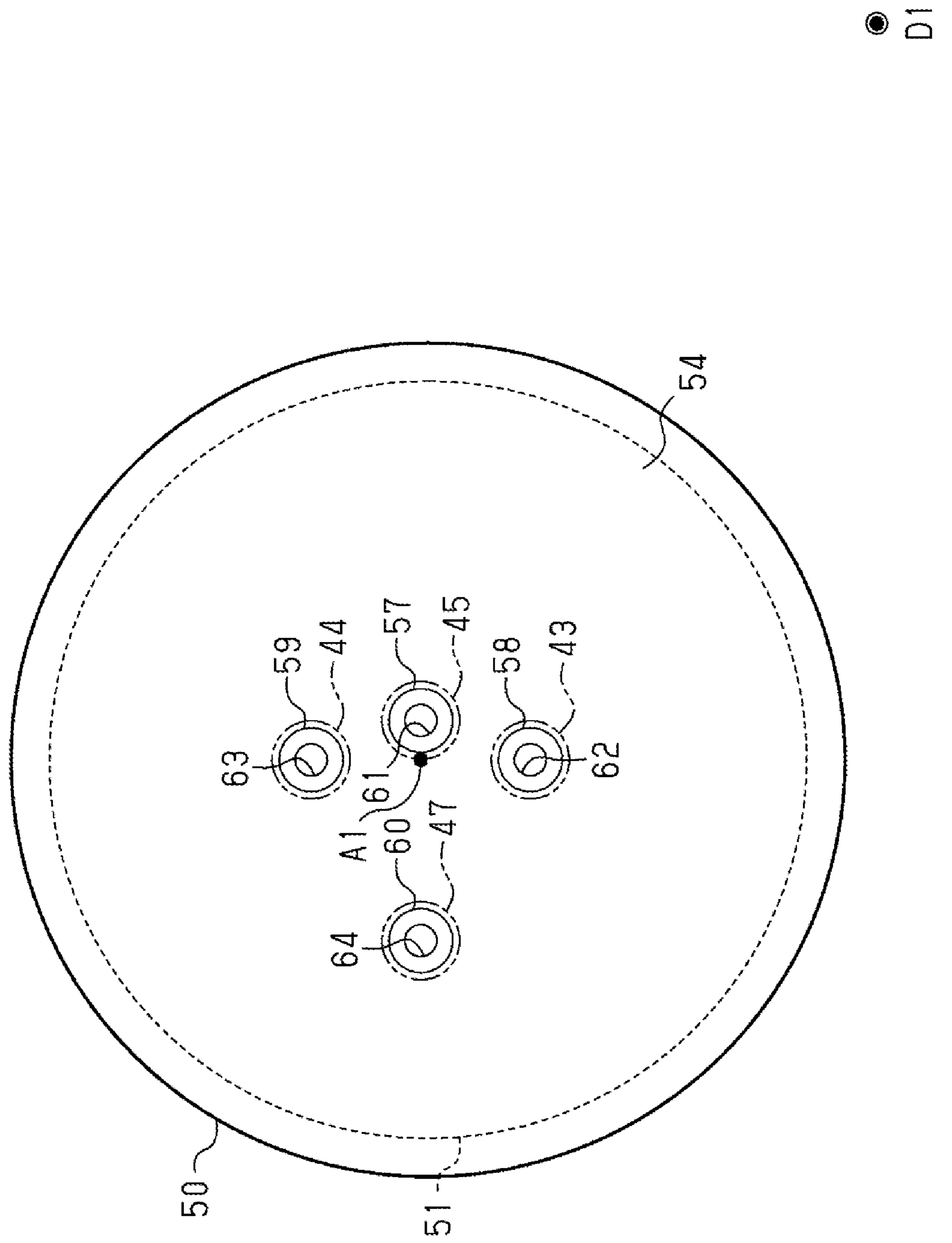
FIG. 4 is a front view of a housing included in the switching portion.

As illustrated in FIG. 4, the housing 50 includes a plurality of flow path pipes. The housing 50 of the embodiment includes a first flow path pipe 57, a second flow path pipe 58, a third flow path pipe 59 and a fourth flow path pipe 60. The first flow path pipe 57, the second flow path pipe 58, the third flow path pipe 59 and the fourth flow path pipe 60 extend from the coupling surface 54. The coupling pipe 45 is coupled to the first flow path pipe 57. The suction pipe 43 is coupled to the second flow path pipe 58. The exhaust pipe 44 is coupled to the third flow path pipe 59. The open pipe 47 is coupled to the fourth flow path pipe 60.

The housing 50 includes a plurality of flow paths. The housing 50 includes, for example, a first flow path 61, a second flow path 62, a third flow path 63 and a fourth flow path 64. The first flow path 61 opens to the first flow path pipe 57. The second flow path 62 opens to the second flow path pipe 58. The third flow path 63 opens to the third flow path pipe 59. The fourth flow path 64 opens to the fourth flow path pipe 60. The first flow path 61, the second flow path 62, the third flow path 63 and the fourth flow path 64 open to the contact surface 55. The first flow path 61, the second flow path 62, the third flow path 63 and the fourth flow path 64 penetrate the housing 50. The first flow path 61 is coupled to the suction portion 36. The second flow path 62 is coupled to the cap 34. The third flow path 63 is coupled to the supply flow path 19, specifically, to the bubble discharge mechanism 20. The fourth flow path 64 is coupled to the cap 34.

In the embodiment, viewing a direction opposite to the axial direction D1 from ahead of the axial direction D1 is also referred to as viewing from the axial direction D1. When viewed from the axial direction D1, the first flow path 61 may be located at a position closer to the rotation axis A1 than the second flow path 62, the third flow path 63 and the fourth flow path 64. When viewed from the axial direction D1, the second flow path 62 and the third flow path 63 may be located at positions point-symmetrical to each other with respect to the rotation axis A1. When viewed from the axial direction D1, the fourth flow path 64 may be located at a position farther from the rotation axis A1 than the first flow path 61, the second flow path 62 and the third flow path 63.

The rotary valve 51 overlaps the housing 50 when viewed from the axial direction D1. The rotary valve 51 rotates in a state of being in contact with the housing 50. When the rotary valve 51 rotates, a coupling destination of a flow path is switched. Specifically, when the rotary valve 51 rotates, a coupling destination of the first flow path 61 is switched between the second flow path 62 and the third flow path 63. When the rotary valve 51 rotates, a coupling destination of the fourth flow path 64 is switched.

Figure 5:
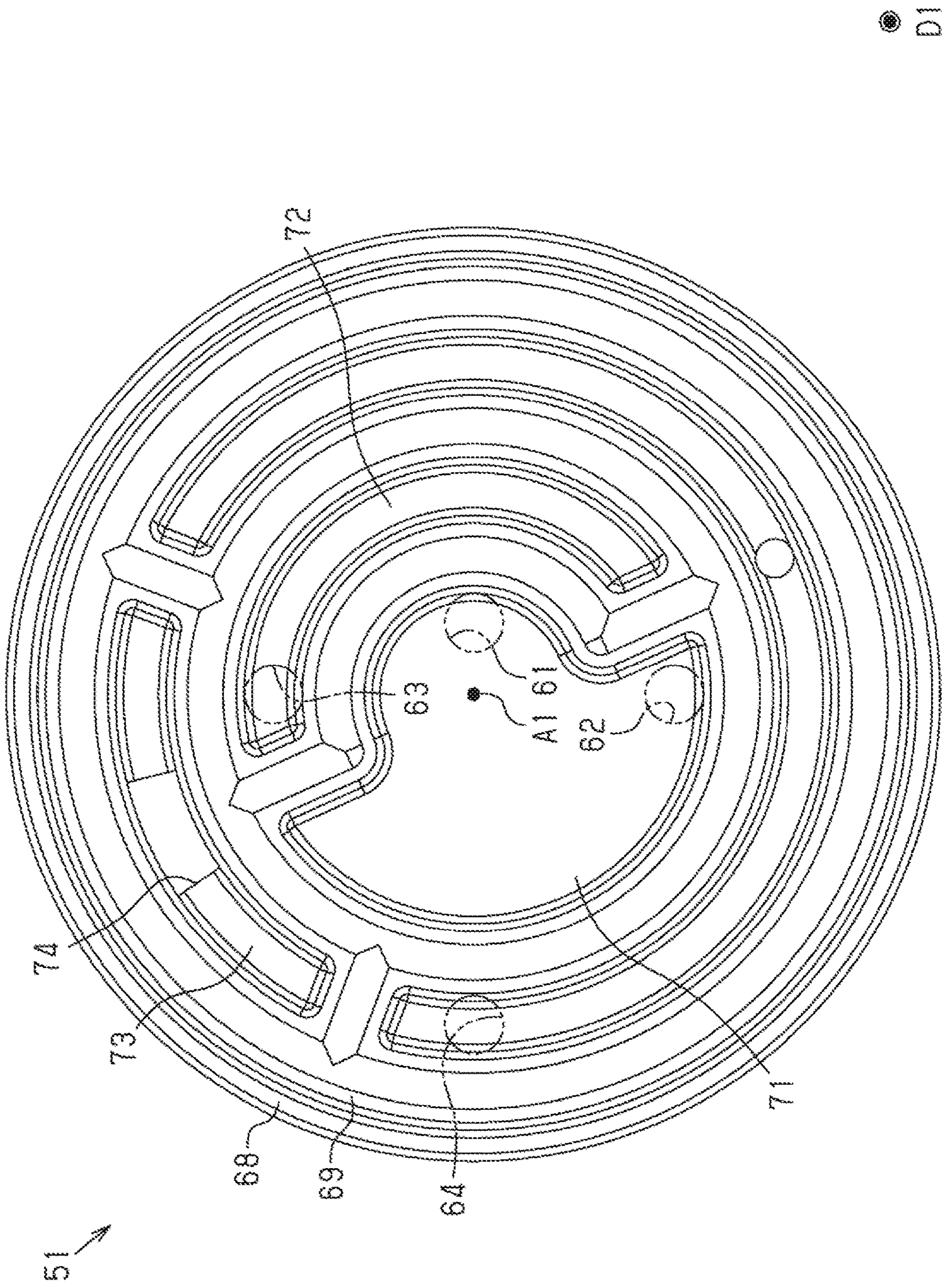
FIG. 5 is a front view of a rotary valve in a first switching pattern.

As illustrated in FIG. 5, the rotary valve 51 may be made of, for example, rubber, elastomer or the like that has elasticity. The rotary valve 51 has, for example, a disk shape. The rotary valve 51 includes a facing surface 68 facing the housing 50. The facing surface 68 of the rotary valve 51 is pressed against the housing 50 by a spring (not illustrated).

The rotary valve 51 includes one or more lips 69. The lip 69 extends towards the contact surface 55 of the housing 50. The lip 69 contacts the contact surface 55 of the housing 50. When the lip 69 contacts the contact surface 55 of the housing 50, the rotary valve 51 and the housing 50 are sealed. Frictional force between the rotary valve 51 and the housing 50 acts on a tip of the lip 69.

The rotary valve 51 may include a first recessed portion 71, a second recessed portion 72 and a third recessed portion 73. The first recessed portion 71 to the third recessed portion 73 are formed at the facing surface 68 and are closed by the housing 50. The first recessed portion 71 to the third recessed portion 73 are formed by the lips 69 protruding from the facing surface 68. That is, the first recessed portion 71 to the third recessed portion 73 are defined by the lips 69.

The first recessed portion 71 is located at a position at which the rotation axis A1 passes through. A shape of the first recessed portion 71 is, for example, a fan shape when viewed from the axial direction D1. A shape of the second recessed portion 72 is, for example, an arc shape when viewed from the axial direction D1. The first recessed portion 71 and the second recessed portion 72 are two regions obtained by dividing an inner side of the circular lip 69 centered on the rotation axis A1 by the lips 69. The third recessed portion 73 is located outside the first recessed portion 71 and the second recessed portion 72 with the rotation axis A1 as a center. A shape of the third recessed portion 73 is, for example, an arc shape when viewed from the axial direction D1.

The first recessed portion 71 faces the first flow path 61. The first recessed portion 71 is located at a position overlapping the first flow path 61 when viewed from the axial direction D1. The first recessed portion 71 constantly faces the first flow path 61 regardless of a rotational phase of the rotary valve 51. When the first recessed portion 71 faces the first flow path 61, the suction pipe 43 communicates with the first recessed portion 71. Therefore, the suction portion 36 suctions the first recessed portion 71.

The first recessed portion 71 is located so as to be capable of facing the second flow path 62. The first recessed portion 71 is located at a position to be capable of overlapping the second flow path 62 when viewed from the axial direction D1. Depending on the rotational phase of the rotary valve 51, the first recessed portion 71 faces or does not face the second flow path 62. When the first recessed portion 71 faces the second flow path 62, the suction pipe 43 communicates with the first recessed portion 71. Therefore, the suction portion 36 can suction the inside of the cap 34 through the first recessed portion 71.

The first recessed portion 71 is located so as to be capable of facing the third flow path 63. The first recessed portion 71 is located at a position to be capable of overlapping the third flow path 63 when viewed from the axial direction D1. Depending on the rotational phase of the rotary valve 51, the first recessed portion 71 faces or does not face the third flow path 63. When the first recessed portion 71 faces the third flow path 63, the exhaust pipe 44 communicates with the first recessed portion 71. Therefore, the suction portion 36 can suction an inside of the supply flow path 19 through the first recessed portion 71.

In the switching portion 37, the shape of the first recessed portion 71, the position of the second flow path 62, the position of the third flow path 63, and the like are considered so that the first recessed portion 71 does not simultaneously face both the second flow path 62 and the third flow path 63. That is, when facing the second flow path 62, the first recessed portion 71 does not face the third flow path 63. When facing the third flow path 63, the first recessed portion 71 does not face the second flow path 62. When the rotary valve 51 rotates, the flow path facing the first recessed portion 71 is switched between the second flow path 62 and the third flow path 63. When the rotary valve 51 rotates, the first recessed portion 71 is switched between a state of facing the first flow path 61 and the second flow path 62 and a state of facing the first flow path 61 and the third flow path 63.

The second recessed portion 72 is located so as to be capable of facing the second flow path 62. The second recessed portion 72 is located at a position to be capable of overlapping the second flow path 62 when viewed from the axial direction D1. Depending on the rotational phase of the rotary valve 51, the second recessed portion 72 faces or does not face the second flow path 62. When the second recessed portion 72 faces the second flow path 62, the suctioning by the suction portion 36 does not reach the suction pipe 43. That is, the suction pipe 43 is closed. For example, when the first flow path 61 and the third flow path 63 face the first recessed portion 71, the second recessed portion 72 faces the second flow path 62.

The second recessed portion 72 is located so as to be capable of facing the third flow path 63. The second recessed portion 72 is located at a position to be capable of overlapping the third flow path 63 when viewed from the axial direction D1. Depending on the rotational phase of the rotary valve 51, the second recessed portion 72 faces or does not face the third flow path 63. When the second recessed portion 72 faces the third flow path 63, the suctioning by the suction portion 36 does not reach the exhaust pipe 44. For example, when the first flow path 61 and the second flow path 62 face the first recessed portion 71, the second recessed portion 72 faces the third flow path 63.

The third recessed portion 73 is located so as to be capable of facing the fourth flow path 64. The third recessed portion 73 is located at a position to be capable of overlapping the fourth flow path 64 when viewed from the axial direction D1. Depending on the rotational phase of the rotary valve 51, the third recessed portion 73 faces or does not face the fourth flow path 64.

A through-hole 74 opens at the third recessed portion 73. The through-hole 74 penetrates the rotary valve 51. Therefore, the third recessed portion 73 communicates with the atmosphere. When the third recessed portion 73 faces the fourth flow path 64, the open pipe 47 communicates with the third recessed portion 73. Thus, the open pipe 47 communicates with the atmosphere. Therefore, the inside of the cap 34 is opened to the atmosphere through the open pipe 47. When the third recessed portion 73 does not face the fourth flow path 64, the open pipe 47 is closed.

Figure 6:
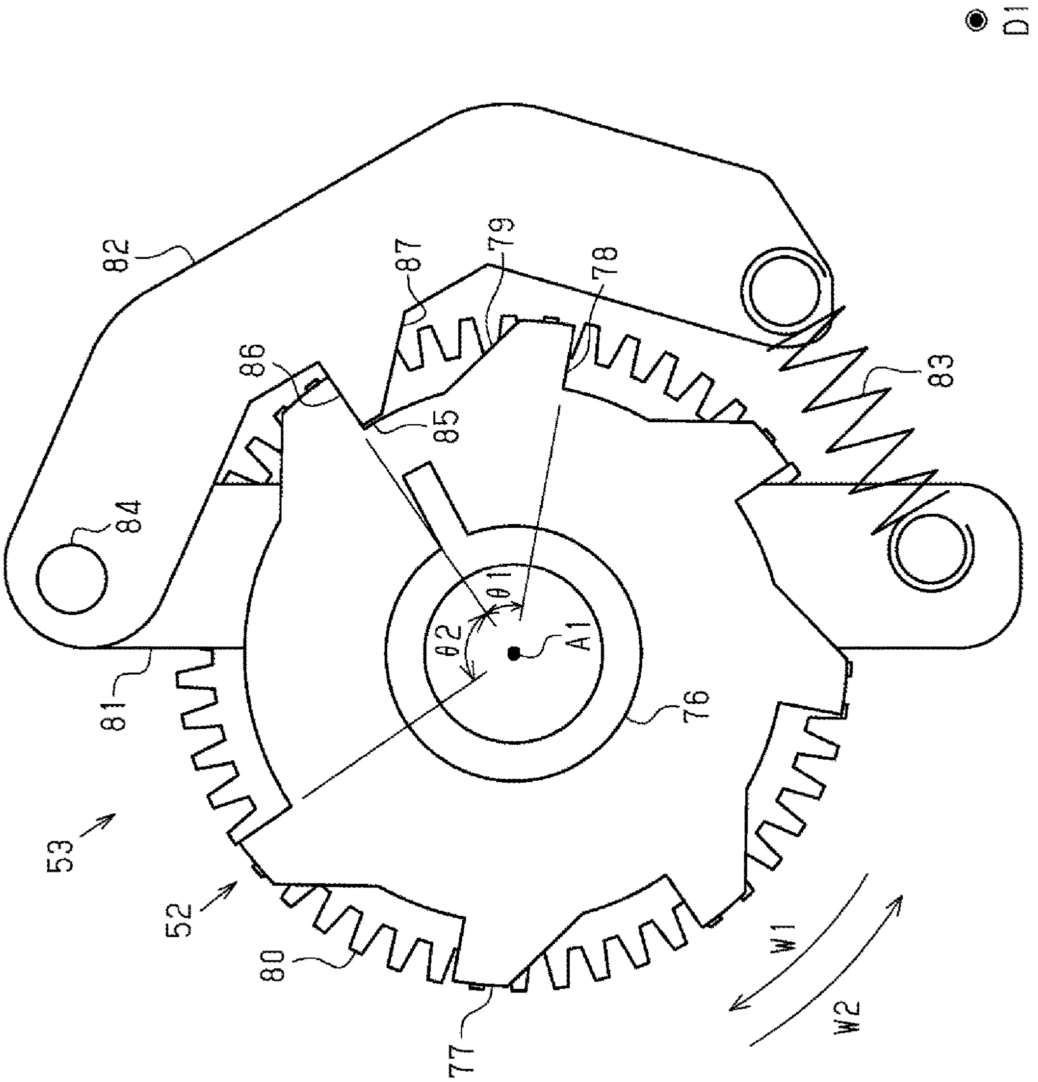
FIG. 6 is a front view of a ratchet gear in the first switching pattern.

As illustrated in FIG. 6, the ratchet gear 52 may include a holding unit 76. The holding unit 76 holds the rotary valve 51 by being inserted into the rotary valve 51. The ratchet gear 52 and the rotary valve 51 rotate integrally.

The ratchet gear 52 includes a plurality of ratchet teeth 77. The ratchet gear 52 of the embodiment includes the seven ratchet teeth 77. The ratchet teeth 77 are provided so as to protrude in a radial direction. The plurality of ratchet teeth 77 are provided at intervals of a first angle θ1 in a circumferential direction, and only one ratchet tooth 77 is provided at an interval of a second angle θ2 larger than the first angle θ1. For example, the first angle θ1 is 45 degrees and the second angle θ2 is 90 degrees. It can also be said that the ratchet gear 52 lacks one of the ratchet teeth 77 provided at the intervals of the first angle θ1.

The ratchet teeth 77 each include an inner engagement surface 78 and an inner inclined surface 79. The inner engagement surface 78 is a surface parallel to a radial direction and the axial direction D1. The inner inclined surface 79 is a surface parallel to the axial direction D1 and is a surface inclined with respect to the radial direction. The inner engagement surface 78 faces in the forward rotation direction W1. In the ratchet tooth 77, in the forward rotation direction W1, the inner engagement surface 78 is located forward the inner inclined surface 79.

The driving body 53 may include a gear portion 80, a first arm portion 81, a second arm portion 82 and a tension spring 83. The first arm portion 81 may include a shaft portion 84. The second arm portion 82 is provided so as to be rotatable about the shaft portion 84. The second arm portion 82 may include a pawl 85.

The tension spring 83 pulls an end of the second arm portion 82 opposite to the shaft portion 84 toward the first arm portion 81. The tension spring 83 presses the pawl 85 against the ratchet gear 52. The second arm portion 82 is displaceable along an outer peripheral surface of the ratchet gear 52.

The pawl 85 is engageable with the ratchet tooth 77. The pawl 85 includes an outer engagement surface 86 and an outer inclined surface 87. The outer engagement surface 86 is a surface parallel to a radial direction centered on the rotation axis A1 and the axial direction D1. The outer inclined surface 87 is a surface parallel to the axial direction D1 and is a surface inclined with respect to the radial direction. The outer engagement surface 86 faces in the backward rotation direction W2. The outer engagement surface 86 is located backward the outer inclined surface 87 in the forward rotation direction W1.

In the embodiment, rotation in the forward rotation direction W1 is also referred to as forward rotation, and rotation in the backward rotation direction W2 is also referred to as backward rotation.

Figure 7:
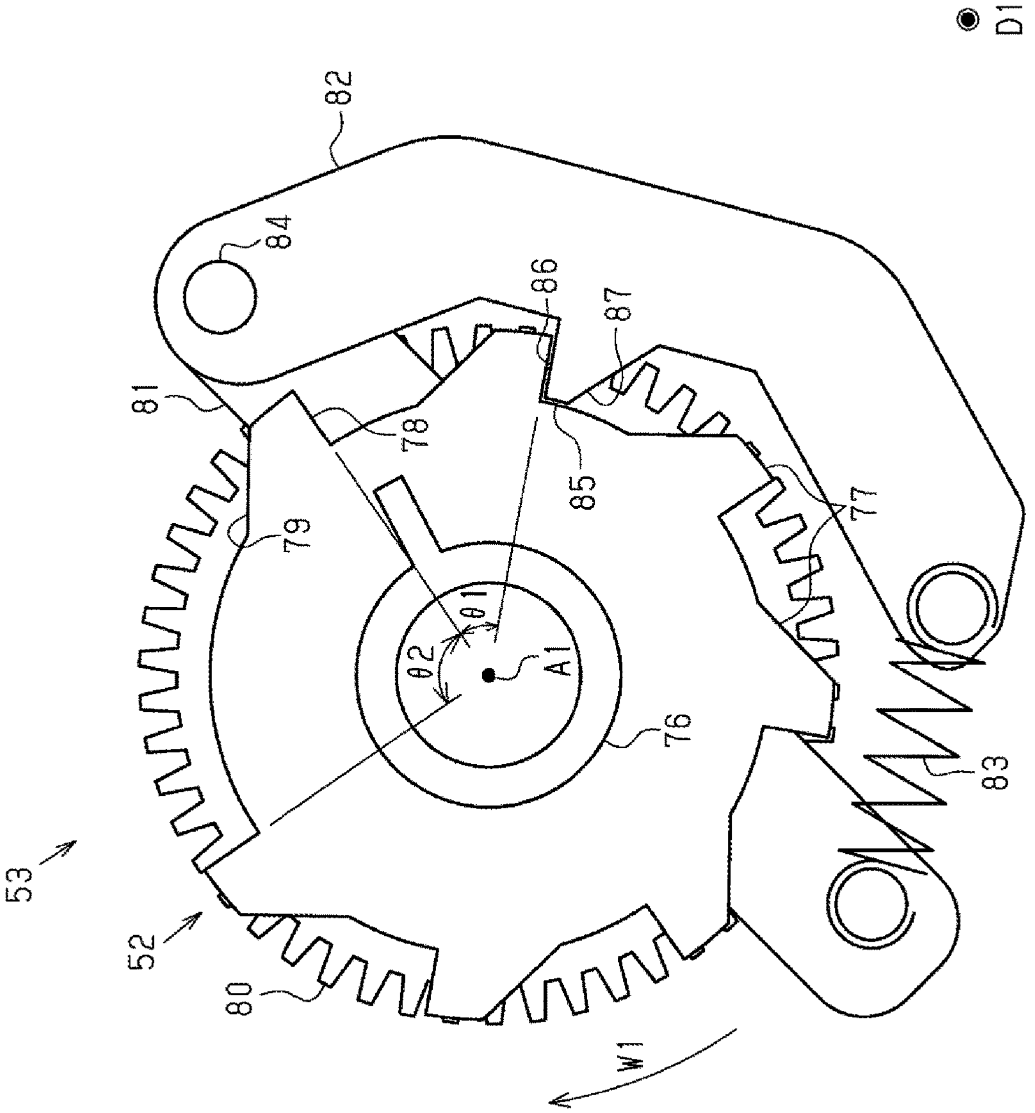
FIG. 7 is a front view of the ratchet gear illustrating a state in which a driving body is rotated forward by a first angle.

As illustrated in FIG. 7, when the driving body 53 rotates forward, the pawl 85 rides over the ratchet tooth 77. That is, the driving body 53 rotates in a direction in which the second arm portion 82 moves away from the rotation axis A1 when the pawl 85 comes into contact with the ratchet tooth 77. Therefore, when the driving body 53 rotates forward, the ratchet gear 52 and the rotary valve 51 do not rotate.

Figure 8:
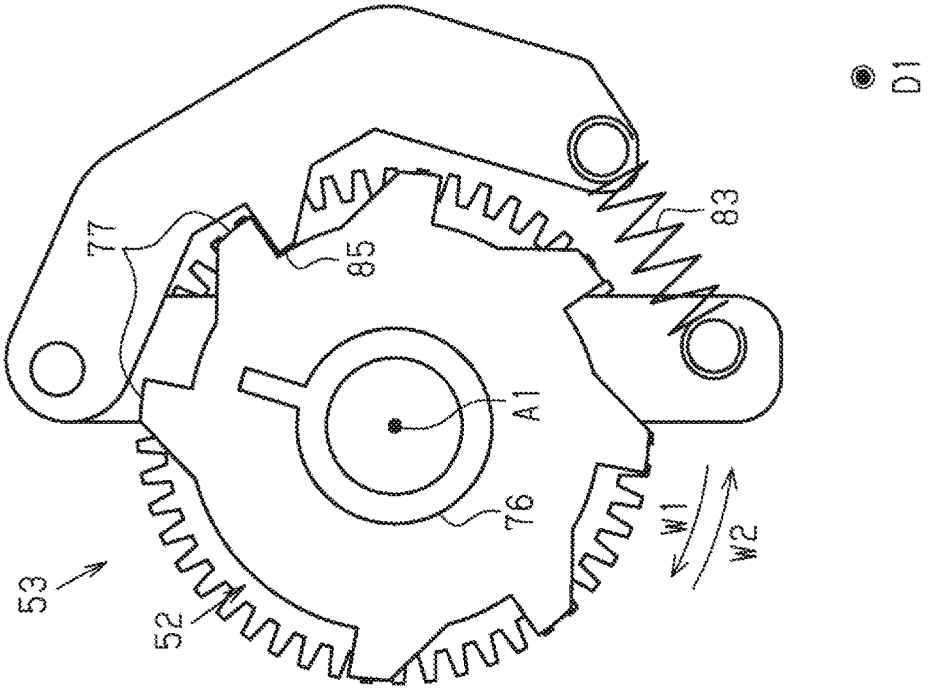
FIG. 8 is a front view of the ratchet gear in a second switching pattern.

As illustrated in FIG. 8, when the driving body 53 rotates backward, the pawl 85 pushes the ratchet tooth 77 to rotate the ratchet gear 52 backward.

The plurality of ratchet teeth 77 are provided in accordance with switching patterns of the rotary valve 51. The switching portion 37 selects from the switching patterns, depending on which ratchet tooth 77 the pawl 85 is brought into contact with. That is, a switching pattern is determined by the switching portion 37 in accordance with a rotational phase of the rotary valve 51.

Operation of Switching Portion

The control unit 48 changes the switching pattern according to the maintenance performed by the maintenance device 23. In the example, there are five switching patterns.

As illustrated in FIGS. 5 and 6, a rotational phase of a first switching pattern is, for example, 0 degrees. In the first switching pattern, the first flow path 61 and the second flow path 62 face the first recessed portion 71. The third flow path 63 faces the second recessed portion 72. The fourth flow path 64 does not face the third recessed portion 73. In the first switching pattern, the suction portion 36 communicates with the inside of the cap 34. In the first switching pattern, the maintenance device 23 can clean the liquid ejecting portion 22.

The switching portion 37 rotates the driving body 53 forward from the first switching pattern by the first angle θ1, and then rotates the driving body 53 backward by the first angle θ1, to switch to a second switching pattern.

Figure 9:
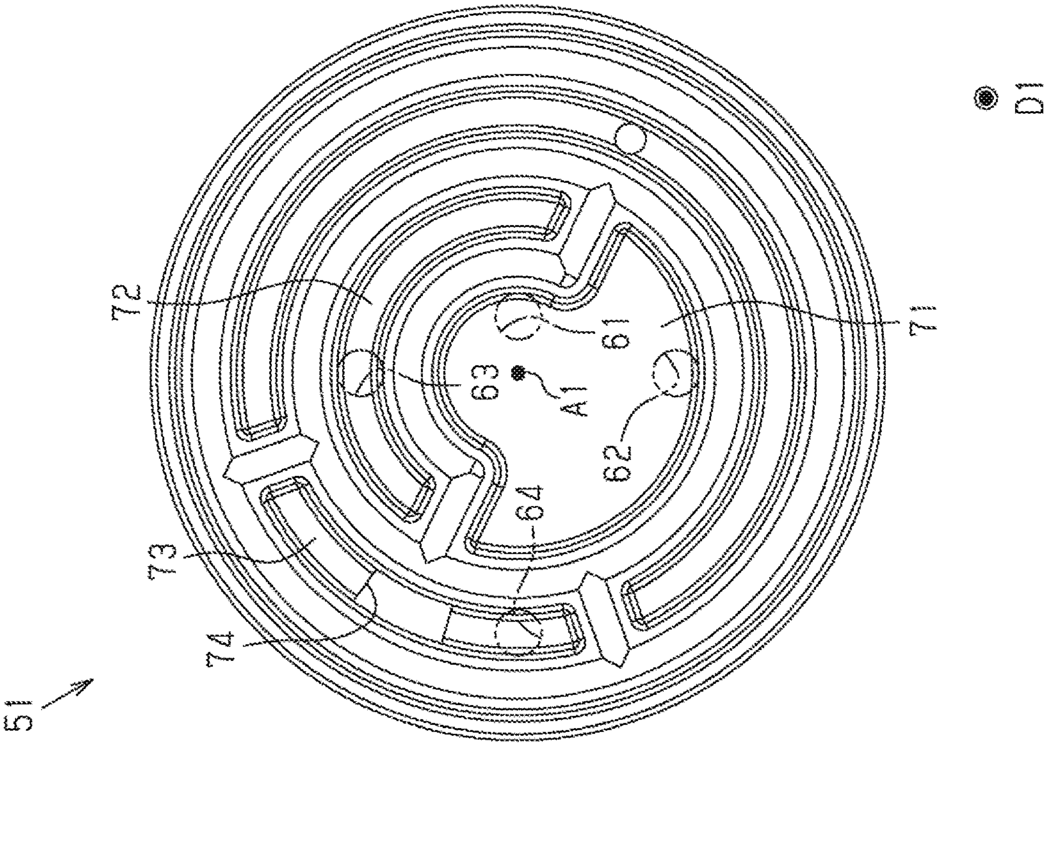
FIG. 9 is a front view of the rotary valve in the second switching pattern.

As illustrated in FIGS. 8 and 9, a rotational phase of the second switching pattern of the embodiment is 45 degrees. In the second switching pattern, the first flow path 61 and the second flow path 62 face the first recessed portion 71. The third flow path 63 faces the second recessed portion 72. The fourth flow path 64 faces the third recessed portion 73. In the second switching pattern, the suction portion 36 communicates with the inside of the cap 34, and the inside of the cap 34 communicates with the atmosphere. In the second switching pattern, idle suction in the cap 34 in a capped state is possible.

The switching portion 37 rotates the driving body 53 forward from the second switching pattern by the first angle θ1, and then rotates the driving body 53 backward by the first angle θ1, to switch to a third switching pattern.

Figure 10:
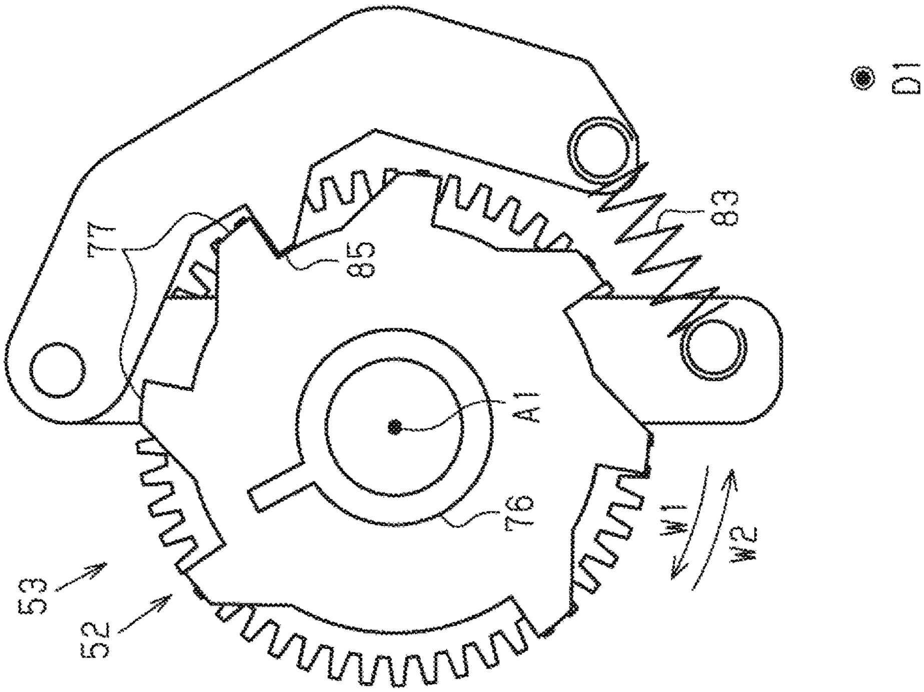
FIG. 10 is a front view of the ratchet gear in a third switching pattern.
Figure 11:
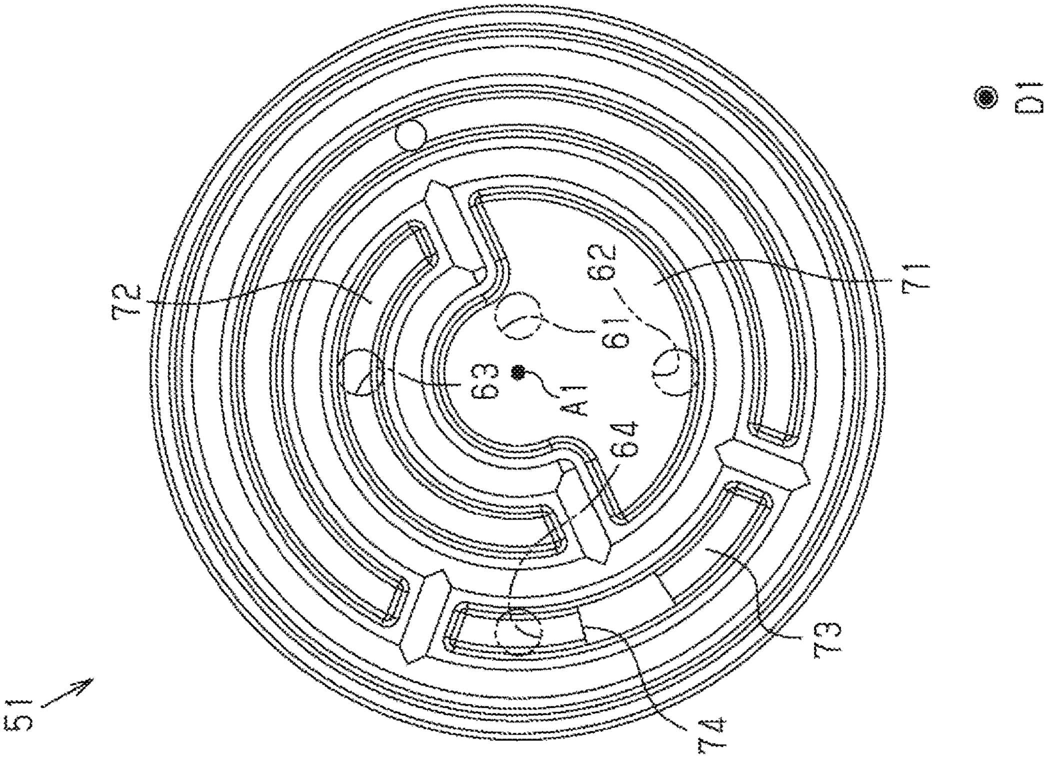
FIG. 11 is a front view of the rotary valve in the third switching pattern.

As illustrated in FIGS. 10 and 11, a rotational phase of the third switching pattern of the embodiment is 90 degrees. In the third switching pattern, the first flow path 61 and the second flow path 62 face the first recessed portion 71. The third flow path 63 faces the second recessed portion 72. The fourth flow path 64 faces the third recessed portion 73. In the third switching pattern, similar to the second switching pattern, the suction portion 36 communicates with the inside of the cap 34, and the inside of the cap 34 communicates with the atmosphere.

The switching portion 37 may switch to the third switching pattern when the maintenance device 23 wipes the liquid ejecting portion 22. The wiping is maintenance for wiping the nozzle surface 32 by a wiper (not illustrated). The maintenance device 23 may perform idle suction simultaneously with wiping.

The switching portion 37 rotates the driving body 53 forward from the third switching pattern by the first angle θ1, and then rotates the driving body 53 backward by the first angle θ1, to switch to a fourth switching pattern.

Figure 12:
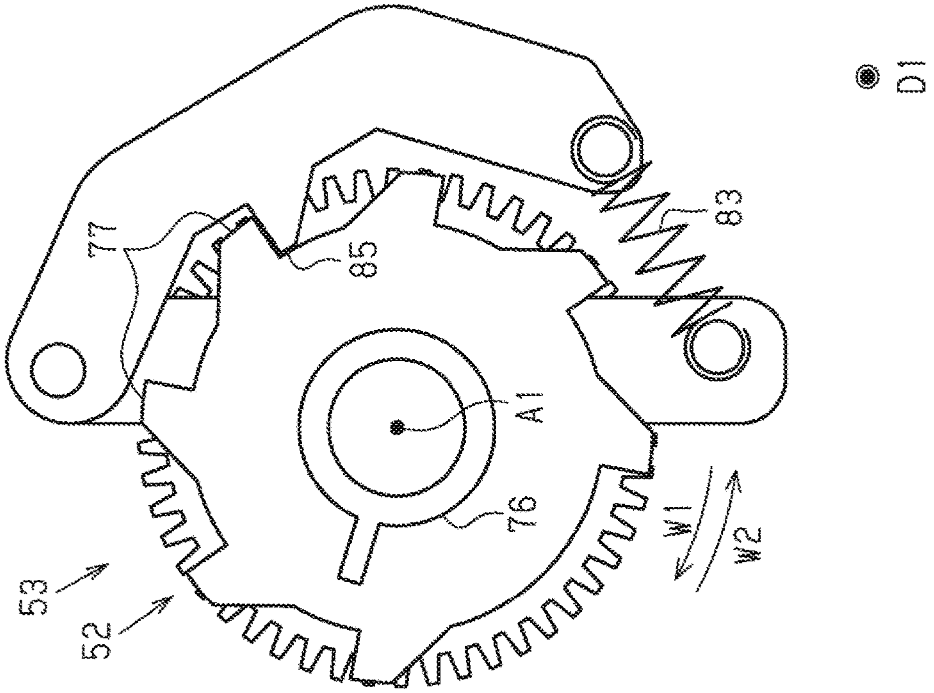
FIG. 12 is a front view of the ratchet gear in a fourth switching pattern.
Figure 13:
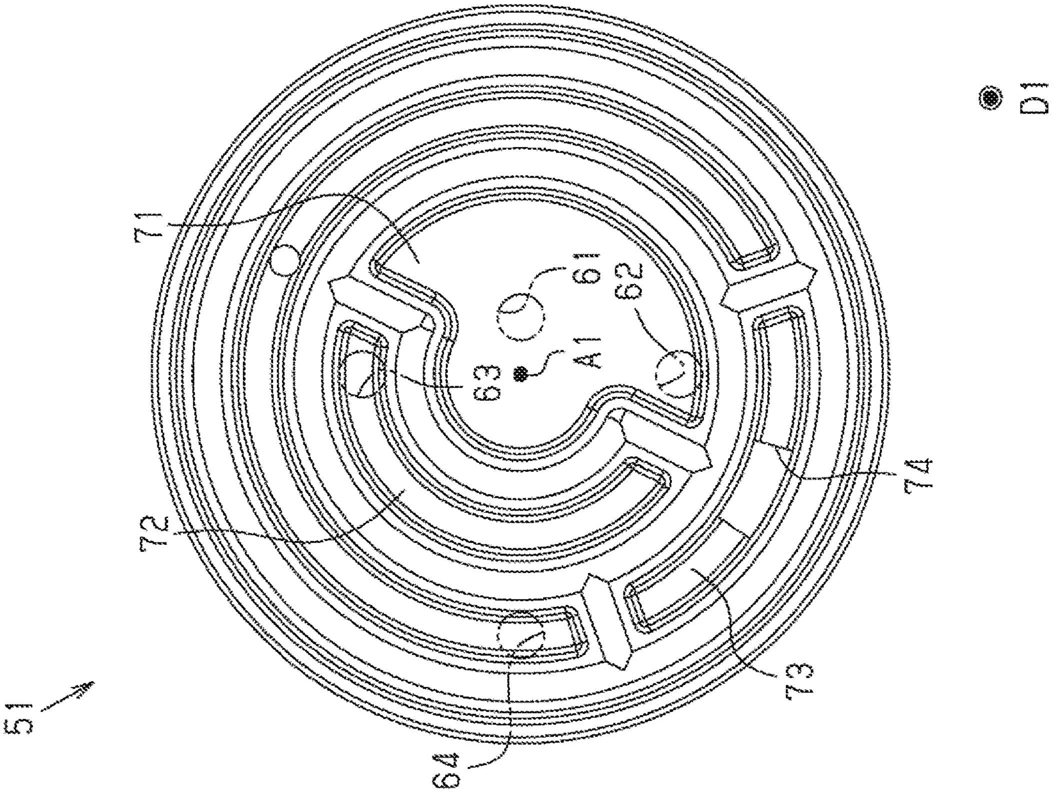
FIG. 13 is a front view of the rotary valve in the fourth switching pattern.

As illustrated in FIGS. 12 and 13, a rotational phase of the fourth switching pattern of the embodiment is 135 degrees. In the fourth switching pattern, the first flow path 61 and the second flow path 62 face the first recessed portion 71. The third flow path 63 faces the second recessed portion 72. The fourth flow path 64 does not face the third recessed portion 73. In the fourth switching pattern, similar to the first switching pattern, the suction portion 36 communicates with the inside of the cap 34. In the fourth switching pattern, idle suction in the cap 34 is possible in a state in which the cap 34 is separated from the liquid ejecting portion 22.

The maintenance device 23 performs maintenance, for example, in an order of cleaning, idle suction and wiping by the switching portion 37 changing the switching patterns in an order of the first switching pattern, the second switching pattern, the third switching pattern and the fourth switching pattern.

The switching portion 37 alternately performs forward rotation and backward rotation of the driving body 53 by the first angle θ1 three times from the fourth switching pattern, to switch to a fifth switching pattern.

Figure 14:
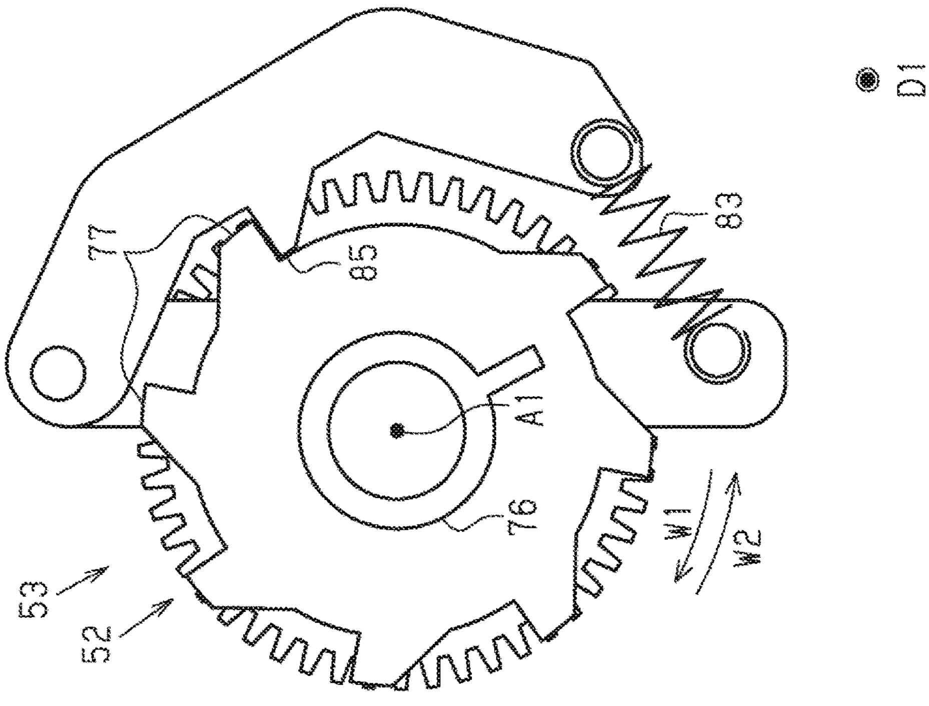
FIG. 14 is a front view of the ratchet gear in a fifth switching pattern.
Figure 15:
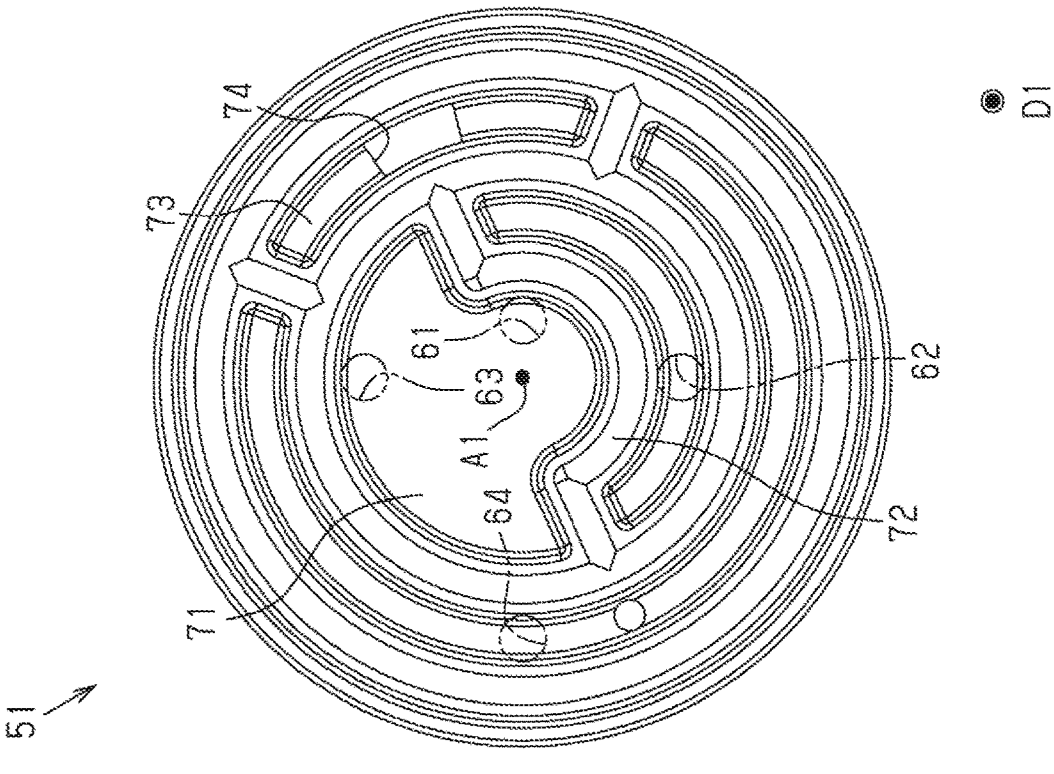
FIG. 15 is a front view of the rotary valve in the fifth switching pattern.

As illustrated in FIGS. 14 and 15, a rotational phase of the fifth switching pattern of the embodiment is 270 degrees. In the fifth switching pattern, the first flow path 61 and the third flow path 63 face the first recessed portion 71. The second flow path 62 faces the second recessed portion 72. The fourth flow path 64 does not face the third recessed portion 73. In the fifth switching pattern, the suction portion 36 communicates with the supply flow path 19. In the fifth switching pattern, air bubbles in the supply flow path 19 can be discharged.

The switching portion 37 rotates the driving body 53 forward from the fifth switching pattern by the second angle θ2, and then rotates the driving body 53 backward by the second angle θ2, to switch to the first switching pattern. That is, even when the switching portion 37 alternately repeats the forward rotation and the backward rotation of the driving body 53 by the first angle θ1 from the fifth switching pattern, the rotational phase of the rotary valve 51 is not changed. Therefore, the switching portion 37 performs the forward rotation and the backward rotation by the first angle θ1 the same number of times as the number of the ratchet teeth 77, and then performs the forward rotation and the backward rotation by the second angle θ2, to switch to the first switching pattern regardless of a previous state.

Cap Moving Portion

Figure 16:
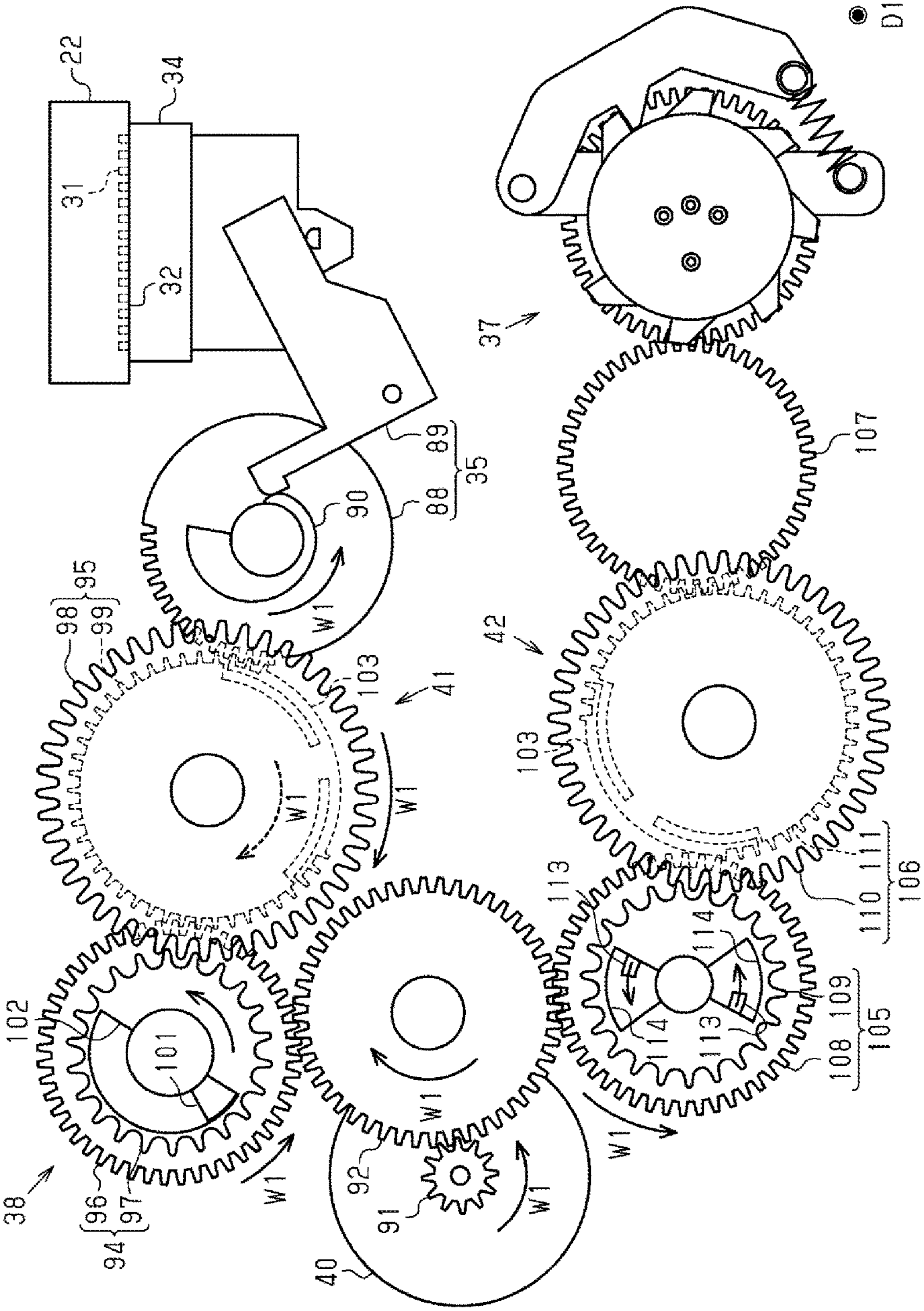
FIG. 16 is a front view of a drive transmission unit during driving to rotate forward.

As illustrated in FIG. 16, the cap moving portion 35 includes a cam gear 88 and a lever member 89. The cam gear 88 is an intermittent gear in which teeth are formed at a portion in a circumferential direction. The cam gear 88 includes a cam surface 90 in which a distance from a shaft changes smoothly in the circumferential direction. The lever member 89 is pressed against the cam surface 90 by a spring (not illustrated). The cap 34 is pushed upward by a spring (not illustrated).

The lever member 89 is rotatable about a shaft. When the cam gear 88 rotates forward, the lever member 89 rotates so as to be separated from the shaft of the cam gear 88 and pushes down the cap 34. When the cam gear 88 rotates backward, the lever member 89 rotates so as to approach the shaft of the cam gear 88 and raises the cap 34.

Drive Transmission Unit

As illustrated in FIG. 16, the drive transmission unit 38 may include a first drive gear 91 and a second drive gear 92. The first drive gear 91 rotates integrally with an output shaft of the drive source 40. The second drive gear 92 meshes with the first drive gear 91. The first drive gear 91 and the second drive gear 92 are spur gears. The first transmission mechanism 41 and the second transmission mechanism 42 are coupled to the second drive gear 92.

The first transmission mechanism 41 forms a power transmission path between the second drive gear 92 and the cap moving portion 35. The first transmission mechanism 41 may include a first drive delay unit 94 and a first friction clutch 95. The first drive delay unit 94 may include a first driven gear 96 and a first delay gear 97. The first friction clutch 95 may include a first gear 98 and a first intermittent gear 99.

The first driven gear 96 is a spur gear that meshes with the second drive gear 92. The first driven gear 96 and the first delay gear 97 may rotate so as to slide with respect to the same shaft. The first driven gear 96 and the first delay gear 97 are separately rotatable about the same shaft.

The first driven gear 96 may include a first protruding portion 101 protruding in the axial direction D1. The first delay gear 97 may include a first hole portion 102. The first protruding portion 101 is located in the first hole portion 102. In a direction in which the first driven gear 96 rotates, a size of the first protruding portion 101 is smaller than that of the first hole portion 102. When the first driven gear 96 rotates, the first protruding portion 101 moves in the first hole portion 102, and abuts against an end of the first hole portion 102 to push the first delay gear 97, thereby rotating the first delay gear 97. That is, in the first drive delay unit 94, even when the first driven gear 96 rotates, the first delay gear 97 does not rotate while the first protruding portion 101 moves in the first hole portion 102. After the first protruding portion 101 moves to the end of the first hole portion 102, the first delay gear 97 rotates with a delay from the first driven gear 96.

The first gear 98 and the first intermittent gear 99 are coupled to the first drive delay unit 94. In other words, the first gear 98 meshes with the first delay gear 97. The first gear 98 rotates integrally with a shaft. The first intermittent gear 99 meshes with the first driven gear 96.

The first intermittent gear 99 rotates also by friction with the first gear 98. Specifically, the first intermittent gear 99 is provided to be rotatable by friction with a shaft of the first gear 98. The first intermittent gear 99 is coupled to the cap moving portion 35. The first intermittent gear 99 meshes with the cam gear 88.

The first intermittent gear 99 includes a toothless portion 103. The toothless portion 103 is provided with a plurality of teeth at both ends in a circumferential direction, but is not provided with teeth at a central portion. The toothless portion 103 is supported at a central portion in the circumferential direction so as to be flexibly deformable.

When teeth of the first driven gear 96 and the first intermittent gear 99 mesh with each other, drive force is transmitted from the first driven gear 96 to the first intermittent gear 99. When the toothless portion 103 of the first intermittent gear 99 faces the first driven gear 96, drive force is not transmitted from the first driven gear 96 to the first intermittent gear 99. When teeth of the first intermittent gear 99 and the cam gear 88 mesh with each other, drive force is transmitted from the first intermittent gear 99 to the cam gear 88. When the toothless portion 103 of the first intermittent gear 99 faces the cam gear 88, drive force is not transmitted from the first intermittent gear 99 to the cam gear 88.

The second transmission mechanism 42 forms a power transmission path between the second drive gear 92 and the switching portion 37. The second transmission mechanism 42 may include a second drive delay unit 105, a second friction clutch 106 and a clutch 107. The second drive delay unit 105 may include a second driven gear 108 and a second delay gear 109. The second friction clutch 106 may include a second gear 110 and a second intermittent gear 111.

The second driven gear 108 is a spur gear that meshes with the second drive gear 92. The second driven gear 108 and the second delay gear 109 may rotate so as to slide with respect to the same shaft. The second driven gear 108 and the second delay gear 109 are separately rotatable about the same shaft.

The second driven gear 108 may include one or more second protruding portions 113 protruding in the axial direction D1. The second driven gear 108 of the embodiment includes the two second protruding portions 113 that are provided 180 degrees apart. The second delay gear 109 may include one or more second hole portions 114. The second delay gear 109 of the embodiment includes the two second hole portions 114 that are provided 180 degrees apart. The second protruding portion 113 is located in the corresponding second hole portion 114. In a direction in which the second driven gear 108 rotates, a size of the second protruding portion 113 is smaller than that of the second hole portion 114. When the second driven gear 108 rotates, the second protruding portion 113 moves in the second hole portion 114 and abuts against an end of the second hole portion 114 to push the second delay gear 109, thereby rotating the second delay gear 109. That is, in the second drive delay unit 105, even when the second driven gear 108 rotates, the second delay gear 109 does not rotate while the second protruding portion 113 moves in the second hole portion 114. After the second protruding portion 113 moves to the end of the second hole portion 114, the second delay gear 109 rotates with a delay from the second driven gear 108.

In a circumferential direction, a phase difference from end to end of the second hole portion 114 is smaller than a phase difference from end to end of the first hole portion 102. A phase in which the second protruding portion 113 is movable in the second hole portion 114 is smaller than a phase in which the first protruding portion 101 is movable in the first hole portion 102, and is larger than a phase when the cap 34 is rotated to move.

The second gear 110 and the second intermittent gear 111 are coupled to the second drive delay unit 105. That is, the second gear 110 meshes with the second delay gear 109. The second gear 110 rotates integrally with a shaft. The second intermittent gear 111 meshes with the second driven gear 108.

The second intermittent gear 111 rotates also by friction with the second gear 110. Specifically, the second intermittent gear 111 is provided to be rotatable by friction with the shaft of the second gear 110. The second intermittent gear 111 meshes with the clutch 107. Since the configuration of the second intermittent gear 111 is the same as that of the first intermittent gear 99, the same reference numerals are given and the description thereof is omitted. In other words, the second intermittent gear 111 includes the toothless portion 103.

When teeth of the second driven gear 108 and the second intermittent gear 111 mesh with each other, drive force is transmitted from the second driven gear 108 to the second intermittent gear 111. When the toothless portion 103 of the second intermittent gear 111 faces the second driven gear 108, drive force is not transmitted from the second driven gear 108 to the second intermittent gear 111. When teeth of the second intermittent gear 111 and the clutch 107 mesh with each other, drive force is transmitted from the second intermittent gear 111 to the clutch 107. When the toothless portion 103 faces the clutch 107, drive force is not transmitted from the second intermittent gear 111 to the clutch 107.

The clutch 107 is an electromagnetic clutch capable of switching between transmission and interruption of drive force under the control of the control unit 48, for example. When the clutch 107 meshes with the second intermittent gear 111, drive force is transmitted from the second intermittent gear 111 to the switching portion 37 via the clutch 107. The clutch 107 may interrupt the transmission of drive force by releasing the meshing with the second intermittent gear 111. The clutch 107 may interrupt the transmission of drive force by causing the gear that meshes with the second intermittent gear 111 to idle.

Operation of Drive Transmission Unit when Capping is Released

As illustrated in FIG. 16, when the drive source 40 drives to rotate forward, the first drive gear 91, the second drive gear 92, the first driven gear 96 and the second driven gear 108 rotate forward.

The first intermittent gear 99 is in a state of meshing with the first driven gear 96 and the cam gear 88. Therefore, the first transmission mechanism 41 transmits drive force to the first driven gear 96, the first intermittent gear 99 and the cam gear 88 in this order. That is, the first driven gear 96, the first intermittent gear 99 and the cam gear 88 rotate forward.

When the first protruding portion 101 pushes the end of the first hole portion 102 from an inside of the first hole portion 102, the first driven gear 96 that rotates forward rotates the first delay gear 97 forward. The first gear 98 rotates forward in accordance with the rotation of the first delay gear 97.

Figure 17:
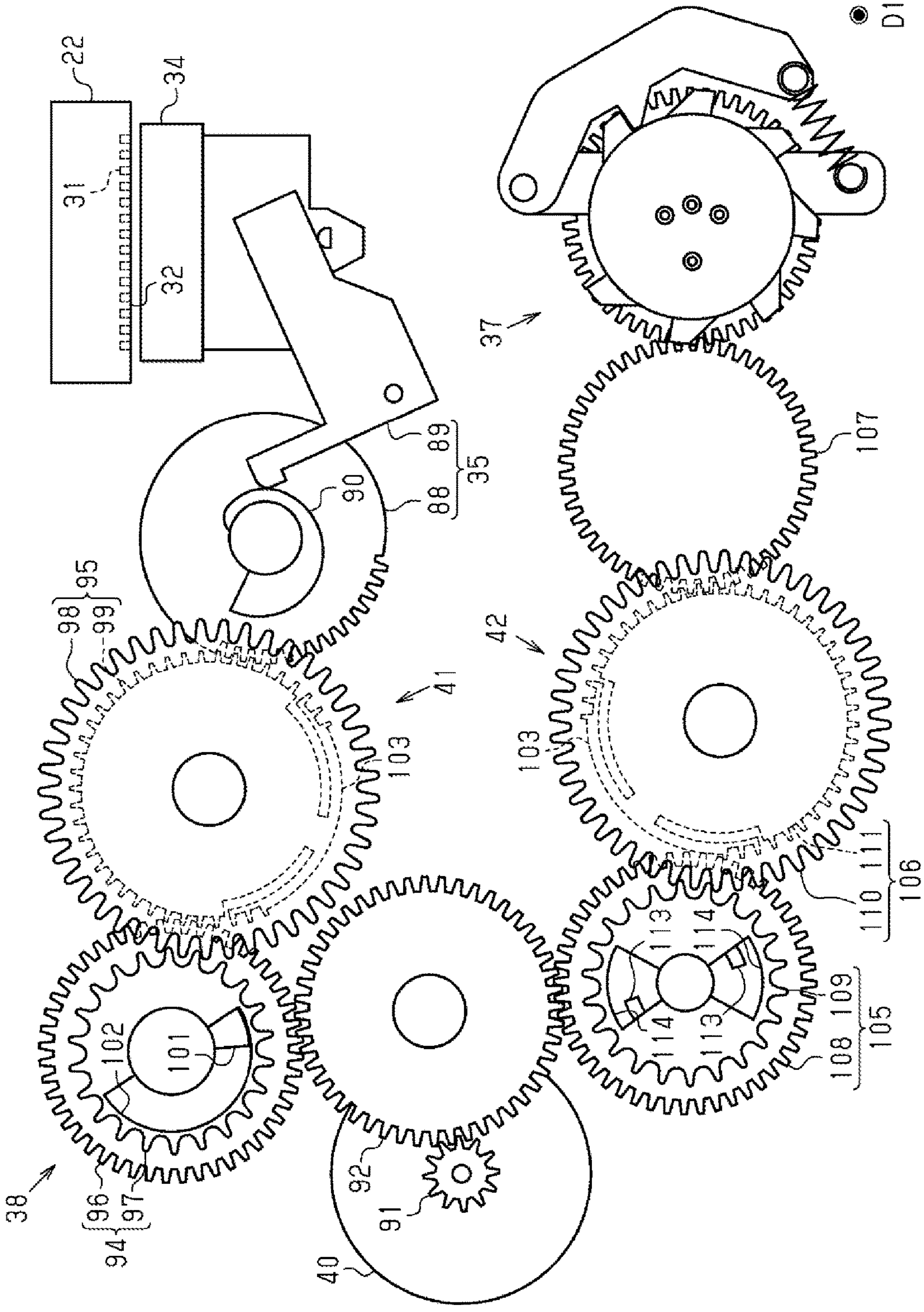
FIG. 17 is a front view of the drive transmission unit with a cap open.

As illustrated in FIG. 17, the first transmission mechanism 41 causes the cap moving portion 35 to lower the cap 34 by rotating the cam gear 88 forward. The lowered cap 34 opens the liquid ejecting portion 22. The opened liquid ejecting portion 22 moves from a position facing the cap 34, for example, and performs printing.

As illustrated in FIGS. 16 and 17, when the cap 34 is lowered, the second driven gear 108 rotates in accordance with the rotation of the second drive gear 92. Since meshing of the second intermittent gear 111 with the second driven gear 108 is released, even when the second driven gear 108 rotates, the second intermittent gear 111 does not rotate. Even when the second driven gear 108 rotates, the second protruding portion 113 moves in the second hole portion 114, and thus the second delay gear 109 does not rotate. That is, drive force is not transmitted to the second intermittent gear 111 via the second delay gear 109 and the second gear 110. Therefore, drive force is not transmitted to the switching portion 37 while the cap 34 is lowered.

When the drive source 40 moves the cap 34 via the first transmission mechanism 41, the second drive delay unit 105 does not transmit driving of the drive source 40 even when the drive source 40 drives by a certain amount. Vertical movement of the cap 34 by the cap moving portion 35 may be performed in a section in which driving is not transmitted to the switching portion 37 by the second drive delay unit 105.

Operation of Drive Transmission Unit when Capping is Performed

When capping is performed, the drive source 40 is driven to rotate backward from the state illustrated in FIG. 17.

Figure 18:
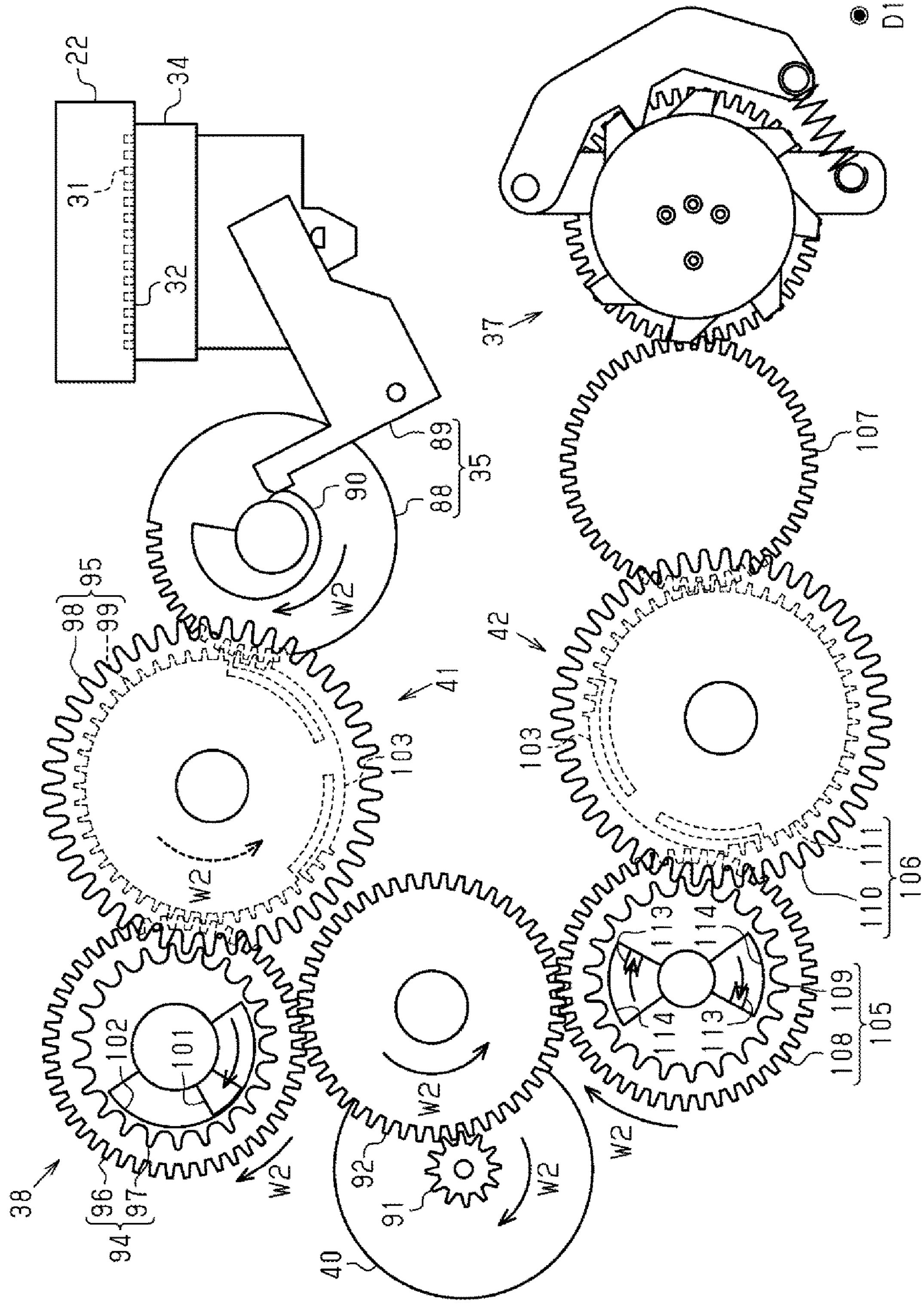
FIG. 18 is a front view of the drive transmission unit during capping.

As illustrated in FIG. 18, when the drive source 40 drives to rotate backward, the first drive gear 91, the second drive gear 92, the first driven gear 96 and the second driven gear 108 rotate backward.

The first intermittent gear 99 is in a state of meshing with the first driven gear 96 and the cam gear 88. Therefore, the first transmission mechanism 41 transmits drive force to the first driven gear 96, the first intermittent gear 99 and the cam gear 88 in this order. That is, the first driven gear 96, the first intermittent gear 99 and the cam gear 88 rotate backward.

When the cam gear 88 rotates backward, the cap moving portion 35 raises the cap 34. That is, the cap 34 caps the liquid ejecting portion 22.

Even when the first driven gear 96 rotates backward, the first delay gear 97 does not rotate while the first protruding portion 101 moves in the first hole portion 102.

Since meshing of the second intermittent gear 111 with the second driven gear 108 is released, even when the second driven gear 108 rotates, the second intermittent gear 111 does not rotate. Even when the second driven gear 108 rotates backward, the second delay gear 109 does not rotate while the second protruding portion 113 moves in the second hole portion 114. Therefore, drive force is not transmitted to the switching portion 37 while the cap 34 is raised.

Operation of Drive Transmission Unit when Switching Portion is Driven

Figure 19:
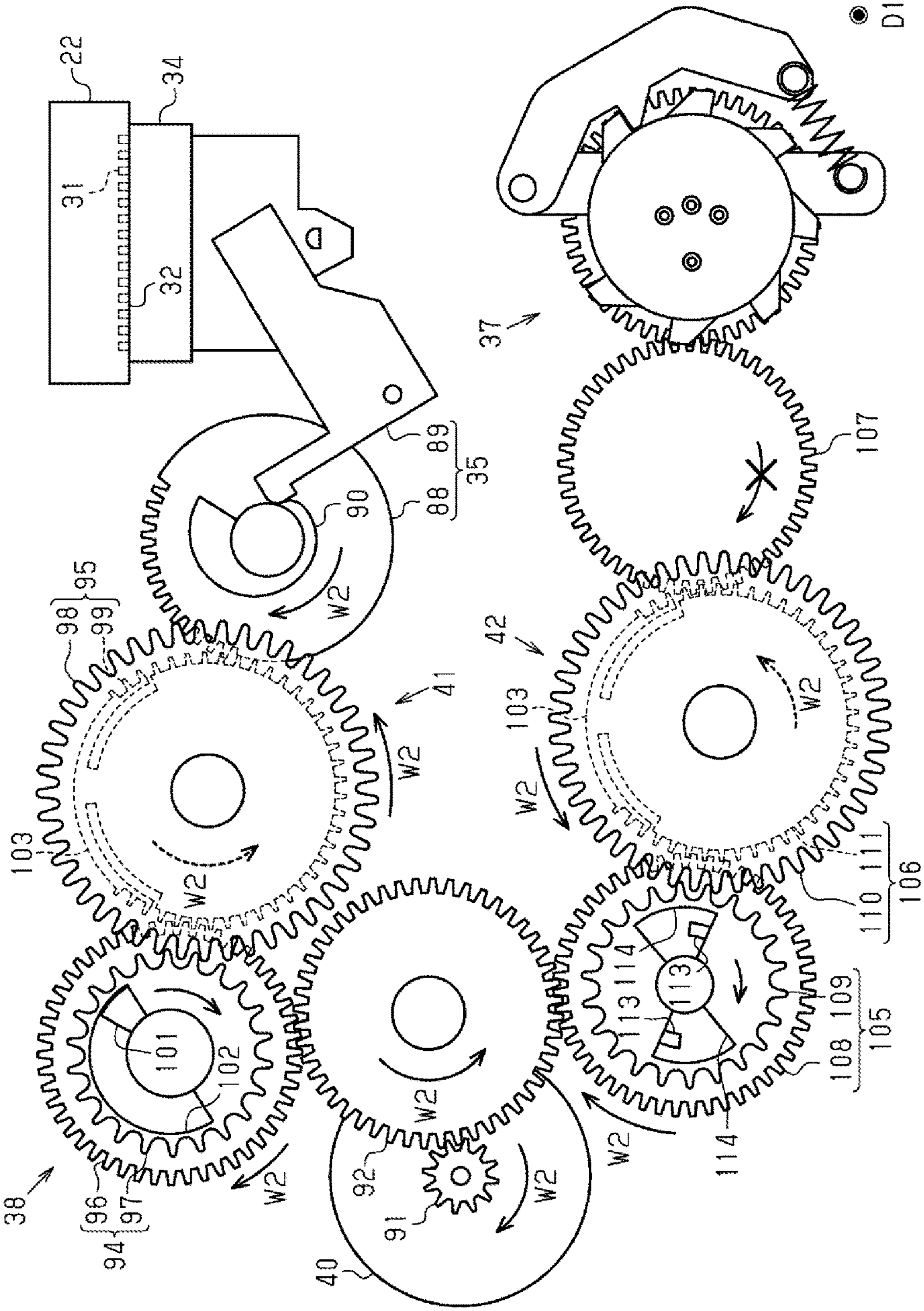
FIG. 19 is a front view of the drive transmission unit during driving to rotate backward.

When the drive source 40 further drives to rotate backward from the state illustrated in FIG. 18, a state illustrated in FIG. 19 is obtained. As illustrated in FIG. 19, when the drive source 40 drives to rotate backward, the first drive gear 91, the second drive gear 92, the first driven gear 96 and the second driven gear 108 rotate backward. The first protruding portion 101 after moving to the end of the first hole portion 102 pushes the first delay gear 97, thereby rotating the first delay gear 97 backward. When the first delay gear 97 rotates backward, the first gear 98 rotates backward. While the first intermittent gear 99 and the first driven gear 96 mesh with each other, the first gear 98 and the first intermittent gear 99 rotate separately.

When a toothless portion faces the first intermittent gear 99, meshing of the cam gear 88 that rotates backward with the first intermittent gear 99 is released. Since the first intermittent gear 99 meshes with the first driven gear 96 even after the meshing with the cam gear 88 is released, the first intermittent gear 99 rotates backward.

Since meshing of the second intermittent gear 111 with the second driven gear 108 is released, drive force is not transmitted from the second driven gear 108 to the second intermittent gear 111 even when the second driven gear 108 rotates.

The second driven gear 108 that rotates backward rotates the second delay gear 109 backward by the second protruding portion 113 pushing the end of the second hole portion 114 from an inside of the second hole portion 114. The second gear 110 rotates in accordance with the rotation of the second delay gear 109. The second intermittent gear 111 rotates in the same direction as the second gear 110 by friction with the shaft of the rotating second gear 110. While the drive source 40 drives to rotate backward, the clutch 107 interrupts transmission of power. Therefore, even when the second intermittent gear 111 rotates, drive force is not transmitted to the switching portion 37.

Figure 20:
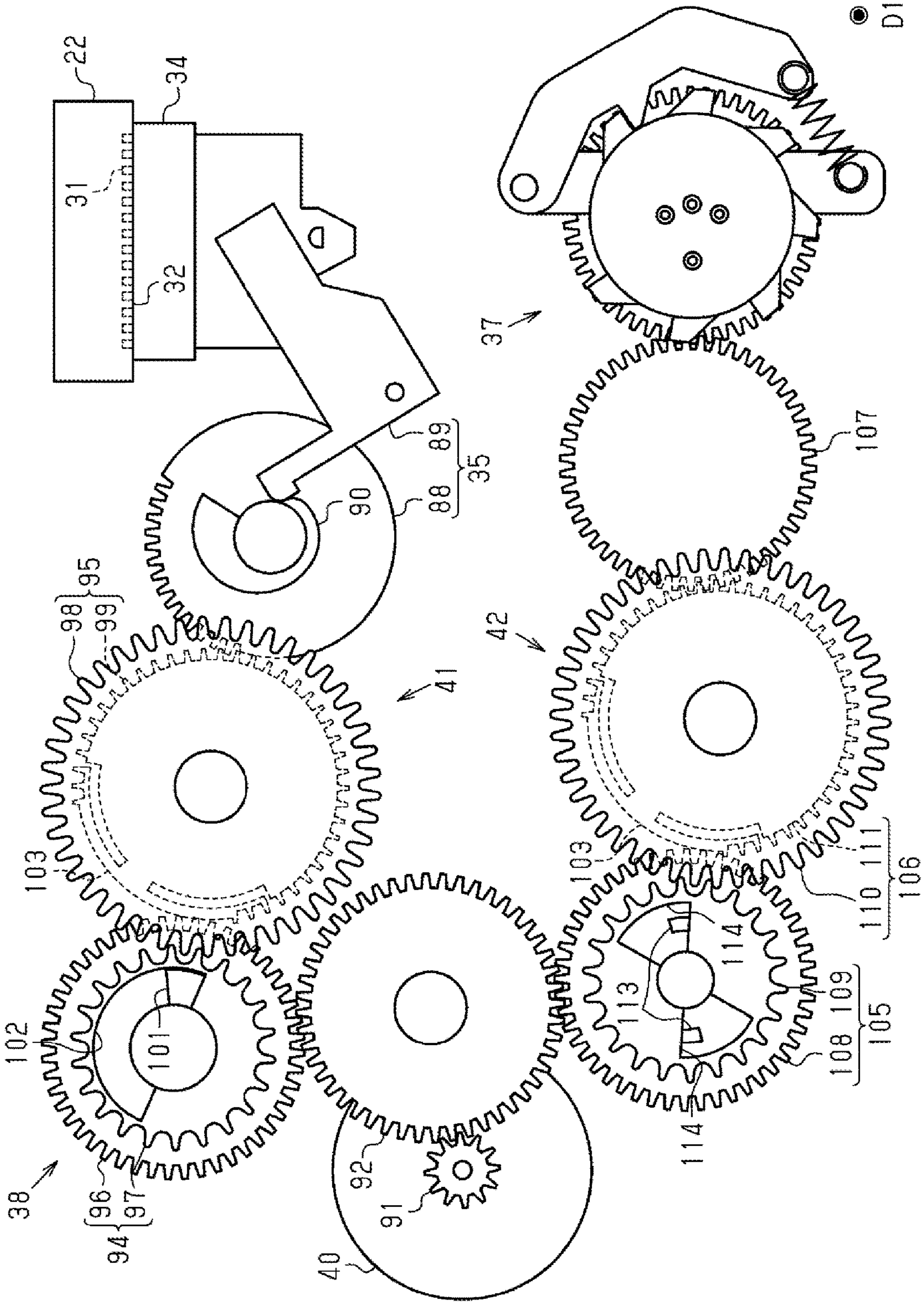
FIG. 20 is a front view of the drive transmission unit in which meshing between a first driven gear and a first intermittent gear is released.

As illustrated in FIG. 20, when the first intermittent gear 99 rotates until the toothless portion 103 of the first intermittent gear 99 faces the first driven gear 96, meshing between the first intermittent gear 99 and the first driven gear 96 is released. When the meshing between the first intermittent gear 99 and the first driven gear 96 is released, the drive source 40 stops backward rotation driving. At this time, meshing between the second intermittent gear 111 and the second driven gear 108 is also released.

Figure 21:
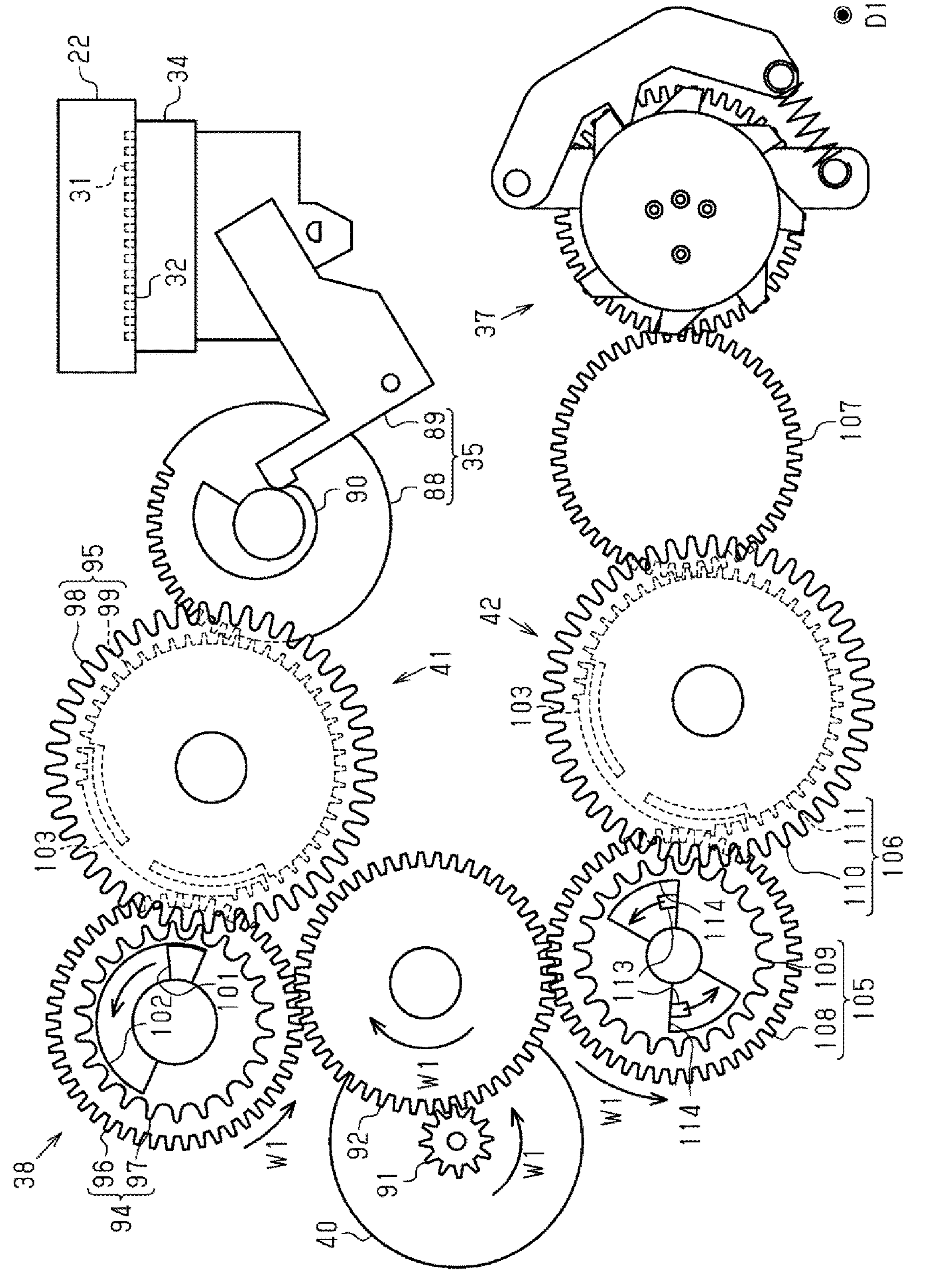
FIG. 21 is a front view of the drive transmission unit during driving to rotate forward.

As illustrated in FIG. 21, when the drive source 40 drives to rotate forward, the first drive gear 91, the second drive gear 92, the first driven gear 96 and the second driven gear 108 rotate forward.

Since the meshing between the first driven gear 96 and the first intermittent gear 99 is released, drive force is not transmitted to the first intermittent gear 99 even when the first driven gear 96 rotates. Even when the first driven gear 96 rotates forward, the first delay gear 97 does not rotate while the first protruding portion 101 moves in the first hole portion 102.

Since the meshing between the second driven gear 108 and the second intermittent gear 111 is released, drive force is not transmitted to the second intermittent gear 111 even when the second driven gear 108 rotates. Even when the second driven gear 108 rotates forward, the second delay gear 109 does not rotate while the second protruding portion 113 moves in the second hole portion 114. When the drive source 40 further drives to rotate forward from the state illustrated in FIG. 21, a state illustrated in FIG. 22 is obtained.

Figure 22:
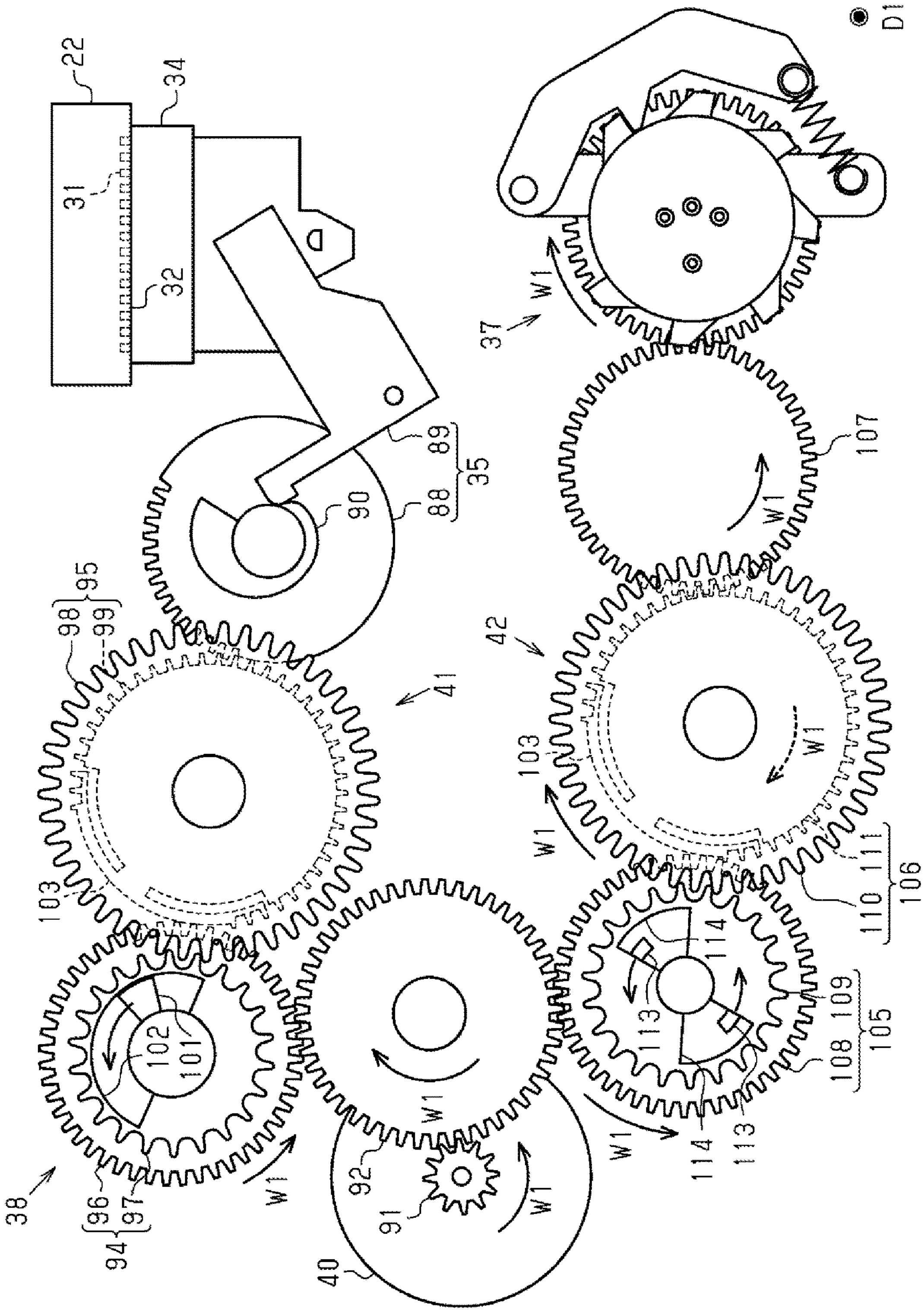
FIG. 22 is a front view of the drive transmission unit during driving to rotate forward.

As illustrated in FIG. 22, the second protruding portion 113 that moves to the end of the second hole portion 114 pushes the second delay gear 109, thereby rotating the second delay gear 109 forward. When the second delay gear 109 rotates forward, the second gear 110 rotates forward. When the second gear 110 rotates, the second intermittent gear 111 rotates in the same direction as the second gear 110 due to friction with the shaft of the rotating second gear 110.

At this time, since the clutch 107 transmits power to the switching portion 37, the switching portion 37 rotates forward. The drive source 40 rotates the switching portion 37 by the first angle θ1 or the second angle θ2 and then stops. While the drive source 40 drives to rotate forward, the first intermittent gear 99 does not rotate. Therefore, the first transmission mechanism 41 does not transmit power to the cap moving portion 35.

Figure 23:
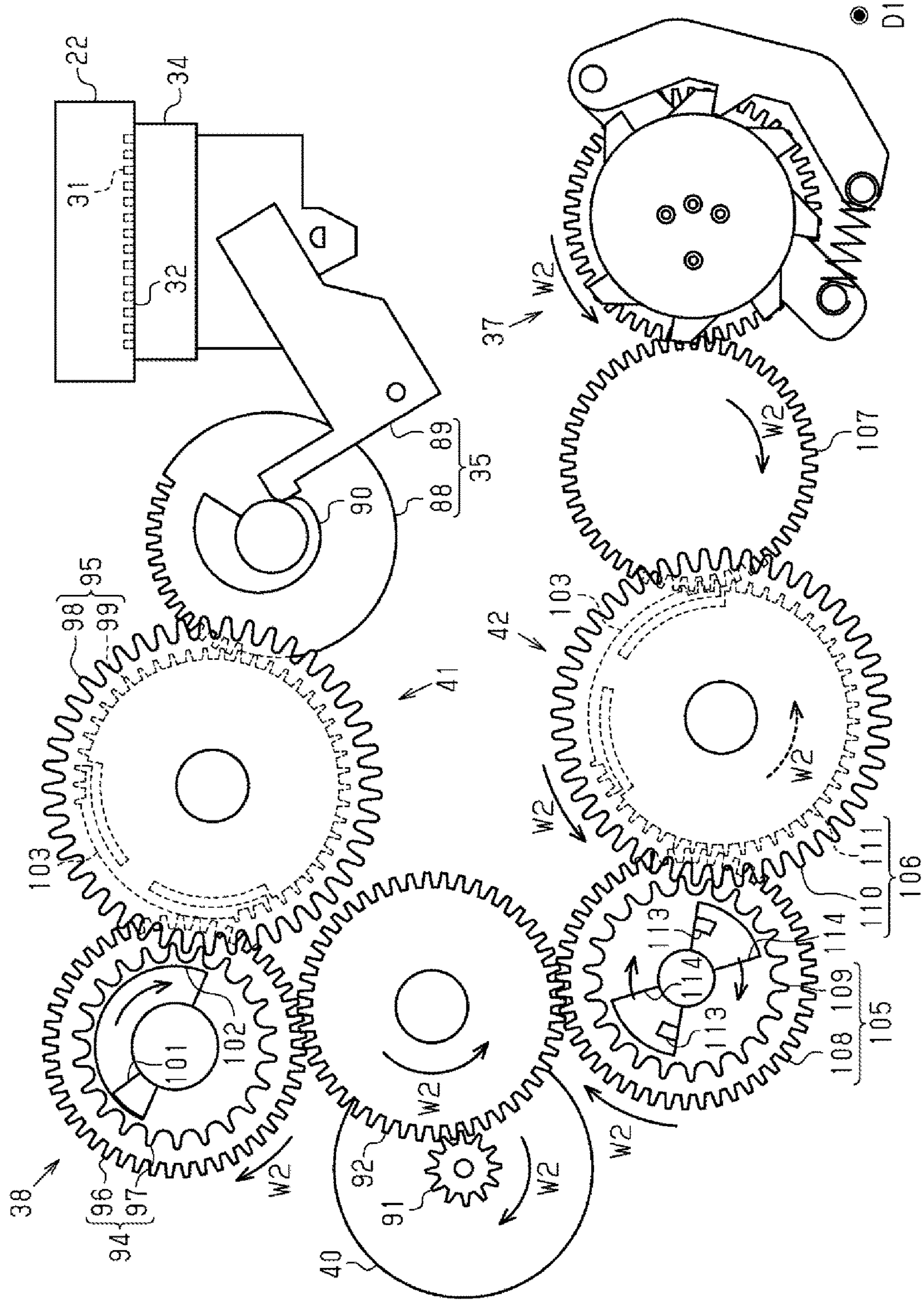
FIG. 23 is a front view of the drive transmission unit during driving to rotate backward.

As illustrated in FIG. 23, when the drive source 40 drives to rotate backward, the first drive gear 91, the second drive gear 92, the first driven gear 96 and the second driven gear 108 rotate backward.

Since the meshing between the first driven gear 96 and the first intermittent gear 99 is released, drive force is not transmitted to the first intermittent gear 99 even when the first driven gear 96 rotates. Even when the first driven gear 96 rotates backward, the first delay gear 97 does not rotate while the first protruding portion 101 moves in the first hole portion 102.

Since the second driven gear 108 and the second intermittent gear 111 mesh with each other, when the second driven gear 108 rotates backward, the second intermittent gear 111 also rotates backward. At this time, since the clutch 107 transmits power to the switching portion 37, the switching portion 37 rotates backward.

When the second driven gear 108 rotates backward, the second protruding portion 113 moves in the second hole portion 114. After the second protruding portion 113 moves to the end of the second hole portion 114, the second delay gear 109 is pushed by the second protruding portion 113 and rotates backward. When the second delay gear 109 rotates backward, the second gear 110 rotates backward. The second gear 110 and the second intermittent gear 111 rotate separately.

Figure 24:
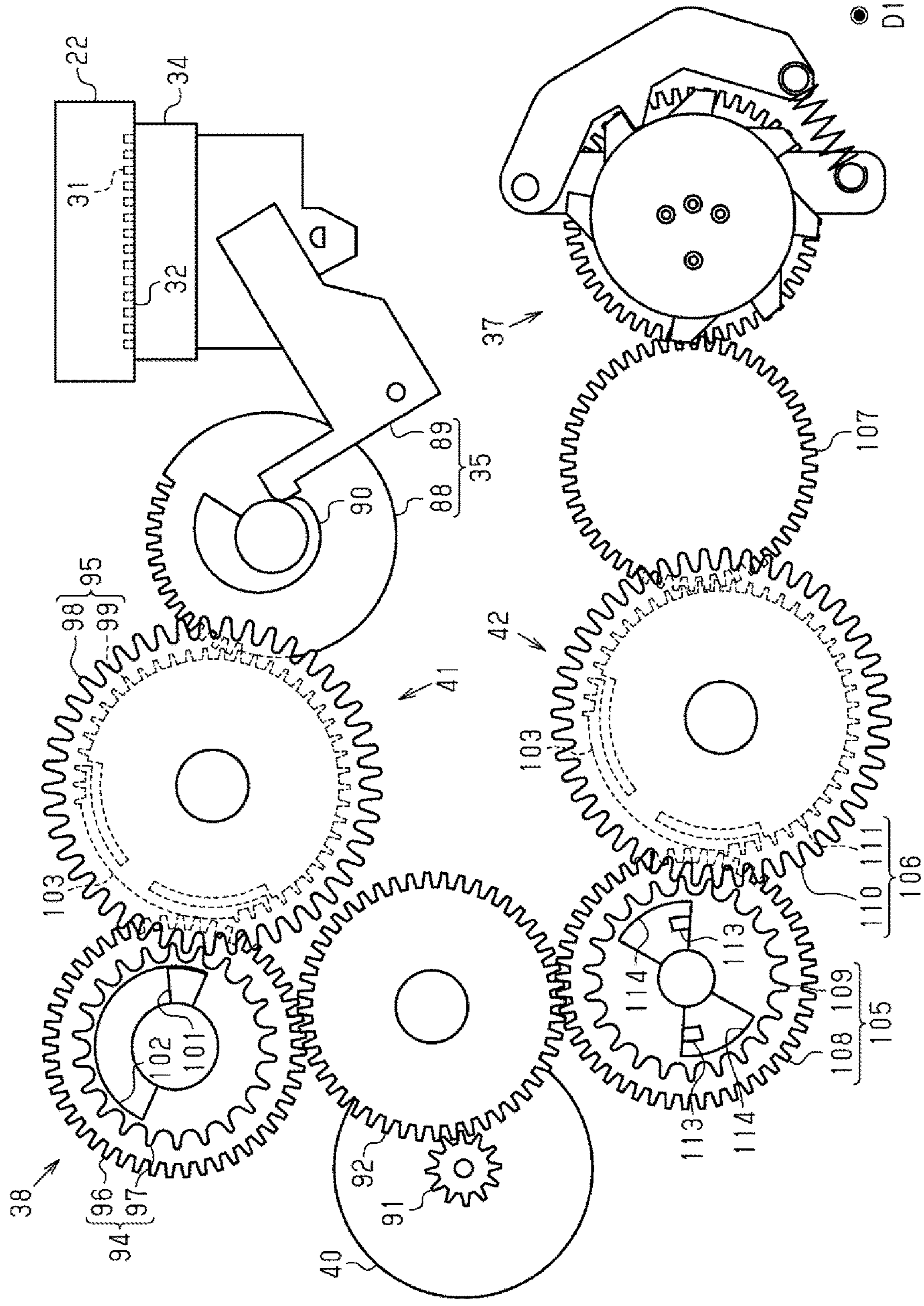
FIG. 24 is a front view of the drive transmission unit after performing switching of a switching portion.

As illustrated in FIG. 24, the drive source 40 rotates the switching portion 37 backward by the first angle θ1 or the second angle θ2 and then stops. While the drive source 40 drives to rotate backward, the first protruding portion 101 moves in the first hole portion 102, so that drive force is not transmitted to the first intermittent gear 99 via the first delay gear 97 and the first gear 98. The first intermittent gear 99 maintains a state of not meshing with the first driven gear 96. Therefore, the first transmission mechanism 41 does not transmit power to the cap moving portion 35. When the drive source 40 performs switching of the switching portion 37 via the second transmission mechanism 42, the first drive delay unit 94 does not transmit driving of the drive source 40 even when the drive source 40 drives by a certain amount. By repeating the operation of FIGS. 21 to 24, the switching pattern can be switched to an optional pattern. Switching by the switching portion 37 may be performed in a section in which driving is not transmitted to the cap moving portion 35 by the first drive delay unit 94.

Actions of Embodiment

Actions of the embodiment will be described.

The maintenance device 23 forms a closed space by the cap 34 by moving the cap moving portion 35 in a section in which driving is not transmitted to the switching portion 37 by the second drive delay unit 105. The maintenance device 23 switches a coupling destination of the suction portion 36 by the switching portion 37 in a section in which driving is not transmitted to the cap moving portion 35 by the first drive delay unit 94. Specifically, the switching portion 37 couples the suction portion 36 to the cap 34. The maintenance device 23 performs suction by the suction portion 36. That is, the maintenance device 23 causes liquid in the liquid ejecting portion 22 to be discharged from the nozzle 31.

Effects of Embodiment

Effects of the embodiment will be described.

(1) The first transmission mechanism 41 includes the first drive delay unit 94. The second transmission mechanism 42 includes the second drive delay unit 105. Therefore, the drive transmission unit 38 can separately perform transmission of driving to the cap moving portion 35 by the first transmission mechanism 41 and transmission of driving to the switching portion 37 by the second transmission mechanism 42. Therefore, it is possible to suppress a decrease in durability times of the cap moving portion 35 and the switching portion 37.

(2) The drive transmission unit 38 performs switching by the switching portion 37 in a section in which driving is not transmitted to the cap moving portion 35. Therefore, the cap moving portion 35 is not driven while the switching is performed by the switching portion 37. Therefore, it is possible to suppress a decrease in the durability time of the cap moving portion 35.

(3) The first transmission mechanism 41 transmits driving to the cap moving portion 35 via the first friction clutch 95. Therefore, the first transmission mechanism 41 can be provided with a simple configuration.

(4) The drive transmission unit 38 performs vertical movement of the cap 34 by the cap moving portion 35 in a section in which power is not transmitted to the switching portion 37. Therefore, the switching portion 37 is not driven while the cap 34 moves vertically. Therefore, it is possible to suppress a decrease in the durability time of the switching portion 37.

Modified Examples

The embodiment can be modified and implemented as follows. The embodiment and the following modified examples can be combined and implemented insofar as no technical contradictions arise.

The cap moving portion 35 may move the cap 34 obliquely with respect to the direction of gravity.

The switching portion 37 may be configured not to include a ratchet mechanism. That is, the switching portion 37 may be configured not to include the ratchet gear 52, the first arm portion 81 and the second arm portion 82. The rotary valve 51 may rotate integrally with the gear portion 80. The switching portion 37 may switch a coupling destination of the suction portion 36 by rotating the driving body 53 in one direction.

The switching portion 37 may include a detection unit that detects a phase of the rotary valve 51. The control unit 48 may drive the drive source 40 based on a detection result of the detection unit.

The clutch 107 may be a one-way clutch. That is, the second transmission mechanism 42 may include a one-way clutch. The one-way clutch is provided between the second intermittent gear 111 and the switching portion 37. For example, the one-way clutch may transmit power to the switching portion 37 when the second intermittent gear 111 rotates forward and may interrupt the transmission of power when the second intermittent gear 111 rotates backward. By transmitting driving via the one-way clutch, the second transmission mechanism 42 can be provided with a simple configuration.

Vertical movement of the cap 34 by the cap moving portion 35 may be performed in a section in which the rotary valve 51 does not rotate. Since the switching portion 37 includes the ratchet mechanism, the rotary valve 51 does not rotate even when the driving body 53 rotates forward. When an angle by which the driving body 53 is rotated is smaller than the first angle θ1 or the second angle θ2 which is the interval between the ratchet teeth 77, the rotary valve 51 does not rotate. By moving the cap 34 vertically without rotating the rotary valve 51, wear of the rotary valve 51 can be reduced.

The first friction clutch 95 may be, for example, an electromagnetic clutch capable of controlling transmission and interruption of power. When switching is performed by the switching portion 37, in the first transmission mechanism 41, the electromagnetic clutch may interrupt the transmission of power.

The liquid ejecting device 11 may be a liquid ejecting device that sprays or ejects liquid other than ink. The state of the liquid ejected from the liquid ejecting device in a form of a minute amount of droplet is assumed to include a particulate form, a teardrop form, and a thread like extending form. This liquid may be any material that can be ejected from the liquid ejecting device. For example, the liquid may be any matter in a state of being in a liquid phase, and is assumed to include a liquid body having high or low viscosity, as well as a fluid body such as sol, gel water, other inorganic solvents, an organic solvent, a solution, a liquid resin, a liquid metal, and a metal melt. The liquid includes not only liquid as a single state of the substance, but also includes particles of a functional material made of a solid such as pigment or metal particles dissolved in a solvent, dispersed or mixed in a solvent, and the like. Typical examples of the liquid include ink described in the embodiment above and liquid crystal. Here, ink is assumed to include a general aqueous ink and a solvent ink, as well various liquid compositions such as gel ink and hot-melt ink. Examples of the liquid ejecting device include an apparatus that ejects liquid including, in a dispersed or dissolved form, a material such as an electrode material and a color material used in manufacture of liquid crystal displays, electroluminescent displays, surface emitting displays, color filters and the like in a dispersed or dissolved form. The liquid ejecting device may be an apparatus ejecting bioorganic substances used for biochip manufacturing, an apparatus used as a precision pipette and ejecting liquid to be a sample, a printing apparatus, a micro dispenser, or the like. The liquid ejecting device may be an apparatus ejecting lubricant to a precision machine such as a clock or a camera in a pinpoint manner, or an apparatus ejecting transparent resin liquid such as ultraviolet cure resin or the like on a substrate for forming a tiny hemispherical lens, optical lens, or the like used for an optical communication element and the like. The liquid ejecting device may be an apparatus ejecting etching liquid such as an acid or an alkali for etching a substrate or the like.

Definition

As used herein, the phrase "at least one of" means one or more of specific alternatives. As an example, the phrase "at least one of" as used herein means only one alternative or both of two alternatives, when the number of alternatives is two. As another example, the phrase "at least one of" as used herein means only one alternative, or any combination of two or more alternatives, when the number of alternatives is three or more.

Supplementary Description

Hereinafter, technical concepts and effects thereof that are understood from the above-described exemplary embodiments and modified examples are described.

(A) A maintenance device includes a cap configured to contact a liquid ejecting portion configured to eject liquid from a nozzle to form a closed space at which the nozzle is open, a cap moving portion configured to vertically move the cap, a suction portion, a switching portion configured to switch a coupling destination of the suction portion, and a drive transmission unit configured to drive the cap moving portion and the switching portion, wherein the drive transmission unit includes a drive source, a first transmission mechanism that transmits drive force of the drive source from the drive source to the cap moving portion, and a second transmission mechanism that transmits the drive force of the drive source from the drive source to the switching portion, the first transmission mechanism includes a first drive delay unit that does not transmit driving of the drive source even when the drive source drives by a certain amount when the drive source performs switching of the switching portion via the second transmission mechanism, and the second transmission mechanism includes a second drive delay unit that does not transmit driving of the drive source even when the drive source drives by a certain amount when the drive source performs moving of the cap via the first transmission mechanism.

According to this configuration, the first transmission mechanism includes the first drive delay unit. The second transmission mechanism includes the second drive delay unit. Therefore, the drive transmission unit can separately perform the transmission of driving to the cap moving portion by the first transmission mechanism and the transmission of driving to the switching portion by the second transmission mechanism. Therefore, it is possible to suppress a decrease in durability times of the cap moving portion and the switching portion.

(B) In the maintenance device, switching by the switching portion may be performed in a section in which driving is not transmitted to the cap moving portion by the first drive delay unit.

According to this configuration, the drive transmission unit performs the switching by the switching portion in a section in which driving is not transmitted to the cap moving portion. Therefore, the cap moving portion is not driven while the switching by the switching portion is performed. Therefore, it is possible to suppress a decrease in the durability time of the cap moving portion.

(C) In the maintenance device, the first transmission mechanism may include a first friction clutch, the first friction clutch may include a first gear coupled to the first drive delay unit and a first intermittent gear that rotates by friction with the first gear, and the first intermittent gear may be coupled to the cap moving portion.

According to this configuration, the first transmission mechanism transmits drive force to the cap moving portion via the first friction clutch. Therefore, the first transmission mechanism can be provided with a simple configuration.

(D) In the maintenance device, vertical movement of the cap by the cap moving portion may be performed in a section in which driving is not transmitted to the switching portion by the second drive delay unit.

According to this configuration, the drive transmission unit performs the vertical movement of the cap by the cap moving portion in a section in which power is not transmitted to the switching portion. Therefore, the switching portion is not driven while the vertical movement of the cap is performed. Therefore, it is possible to suppress a decrease in the durability time of the switching portion.

(E) In the maintenance device, the second transmission mechanism may include a second friction clutch and a one-way clutch, the second friction clutch may include a second gear coupled to the second drive delay unit and a second intermittent gear that rotates by friction with the second gear, and the one-way clutch may be provided between the second intermittent gear and the switching portion.

According to this configuration, the second transmission mechanism transmits driving to the switching portion via the second friction clutch and the one-way clutch. Therefore, the second transmission mechanism can be provided with a simple configuration.

(F) A liquid ejecting device may include a liquid ejecting portion configured to eject liquid from a nozzle, a supply flow path configured to supply the liquid to the liquid ejecting portion, and the maintenance device configured as described above, wherein the switching portion may be configured to switch a coupling destination of the suction portion between the cap and the supply flow path.

According to this configuration, the same effect as the maintenance device described above can be obtained.

(G) A maintenance method for a liquid ejecting device is a maintenance method for a liquid ejecting device including a liquid ejecting portion configured to eject liquid from a nozzle, a supply flow path configured to supply the liquid to the liquid ejecting portion, a cap configured to contact the liquid ejecting portion to form a closed space at which the nozzle is open, a cap moving portion configured to vertically move the cap, a suction portion, a switching portion configured to switch a coupling destination of the suction portion to the cap or the supply flow path, and a drive transmission unit configured to drive the cap moving portion and the switching portion, the drive transmission unit including a drive source, a first transmission mechanism that transmits drive force of the drive source from the drive source to the cap moving portion, and a second transmission mechanism that transmits the drive force of the drive source from the drive source to the switching portion, the first transmission mechanism including a first drive delay unit that does not transmit driving of the drive source even when the drive source drives by a certain amount when the drive source performs switching of the switching portion via the second transmission mechanism, the second transmission mechanism including a second drive delay unit that does not transmit driving of the drive source even when the drive source drives by a certain amount when the drive source performs moving of the cap moving portion via the first transmission mechanism, the maintenance method including forming the closed space by the cap by moving the cap moving portion in a section in which the driving is not transmitted to the switching portion by the second drive delay unit, switching the coupling destination of the suction portion by the switching portion in a section in which the driving is not transmitted to the cap moving portion by the first drive delay unit, and suctioning by the suction portion.

According to this method, the same effect as the maintenance device described above can be obtained.

What is claimed is:

1. A maintenance device, comprising:

a cap configured to contact a liquid ejecting portion configured to eject liquid from a nozzle to form a closed space at which the nozzle is open;

a cap moving portion configured to vertically move the cap;

a suction portion;

a switching portion configured to switch a coupling destination of the suction portion; and a drive transmission unit configured to drive the cap moving portion and the switching portion, wherein the drive transmission unit includes a drive source, a first transmission mechanism that transmits drive force of the drive source from the drive source to the cap moving portion, and a second transmission mechanism that transmits the drive force of the drive source from the drive source to the switching portion, the first transmission mechanism includes a first drive delay unit that does not transmit driving of the drive source even when the drive source drives by a certain amount when the drive source performs switching of the switching portion via the second transmission mechanism, and the second transmission mechanism includes a second drive delay unit that does not transmit driving of the drive source even when the drive source drives by a certain amount when the drive source performs moving of the cap via the first transmission mechanism, wherein the switching by the switching portion is performed in a section in which driving is not transmitted to the cap moving portion by the first drive delay unit, the first transmission mechanism includes a first friction clutch, the first friction clutch includes a first gear coupled to the first drive delay unit and a first intermittent gear that rotates by friction with the first gear, and the first intermittent gear is coupled to the cap moving portion.

2. The maintenance device according to claim 1, wherein the vertical movement of the cap by the cap moving portion is performed in a section in which driving is not transmitted to the switching portion by the second drive delay unit.

3. The maintenance device according to claim 2, wherein the second transmission mechanism includes a second friction clutch and a one-way clutch, the second friction clutch includes a second gear coupled to the second drive delay unit and a second intermittent gear that rotates by friction with the second gear, and the one-way clutch is provided between the second intermittent gear and the switching portion.

4. A liquid ejecting device, comprising:

a liquid ejecting portion configured to eject liquid from a nozzle;

a supply flow path configured to supply the liquid to the liquid ejecting portion; and the maintenance device according to claim 1, wherein the switching portion is configured to switch a coupling destination of the suction portion between the cap and the supply flow path.

5. A maintenance method for a liquid ejecting device including a liquid ejecting portion configured to eject liquid from a nozzle, a supply flow path configured to supply the liquid to the liquid ejecting portion, a cap configured to contact the liquid ejecting portion to form a closed space at which the nozzle is open, a cap moving portion configured to vertically move the cap, a suction portion, a switching portion configured to switch a coupling destination of the suction portion to the cap or the supply flow path, and a drive transmission unit for driving the cap moving portion and the switching portion, the drive transmission unit including a drive source, a first transmission mechanism that transmits drive force of the drive source from the drive source to the cap moving portion, and a second transmission mechanism that transmits the drive force of the drive source from the drive source to the switching portion, the first transmission mechanism including a first drive delay unit that does not transmit driving of the drive source even when the drive source drives by a certain amount when the drive source performs switching of the switching portion via the second transmission mechanism, the second transmission mechanism including a second drive delay unit that does not transmit driving of the drive source even when the drive source drives by a certain amount when the drive source performs moving of the cap moving portion via the first transmission mechanism, wherein the switching by the switching portion is performed in a section in which driving is not transmitted to the cap moving portion by the first drive delay unit, the first transmission mechanism includes a first friction clutch, the first friction clutch includes a first gear coupled to the first drive delay unit and a first intermittent gear that rotates by friction with the first gear, and the first intermittent gear is coupled to the cap moving portion, the maintenance method comprising:

forming the closed space by the cap by moving the cap moving portion in a section in which the driving is not transmitted to the switching portion by the second drive delay unit;

switching the coupling destination of the suction portion by the switching portion in a section in which the driving is not transmitted to the cap moving portion by the first drive delay unit; and suctioning by the suction portion.

6. A maintenance device, comprising:

a cap configured to contact a liquid ejecting portion configured to eject liquid from a nozzle to form a closed space at which the nozzle is open;

a cap moving portion configured to vertically move the cap;

a suction portion;

a switching portion configured to switch a coupling destination of the suction portion; and a drive transmission unit configured to drive the cap moving portion and the switching portion, wherein the drive transmission unit includes a drive source, a first transmission mechanism that transmits drive force of the drive source from the drive source to the cap moving portion, and a second transmission mechanism that transmits the drive force of the drive source from the drive source to the switching portion, the first transmission mechanism includes a first drive delay unit that does not transmit driving of the drive source even when the drive source drives by a certain amount when the drive source performs switching of the switching portion via the second transmission mechanism, and the second transmission mechanism includes a second drive delay unit that does not transmit driving of the drive source even when the drive source drives by a certain amount when the drive source performs moving of the cap via the first transmission mechanism, wherein the vertical movement of the cap by the cap moving portion is performed in a section in which driving is not transmitted to the switching portion by the second drive delay unit, the second transmission mechanism includes a second friction clutch and a one-way clutch, the second friction clutch includes a second gear coupled to the second drive delay unit and a second intermittent gear that rotates by friction with the second gear, and the one-way clutch is provided between the second intermittent gear and the switching portion.

7. A liquid ejecting device, comprising:

a liquid ejecting portion configured to eject liquid from a nozzle;

a supply flow path configured to supply the liquid to the liquid ejecting portion; and the maintenance device according to claim 6, wherein the switching portion is configured to switch a coupling destination of the suction portion between the cap and the supply flow path.

* * * * *